(12) United States Patent
DeBortoli et al.

(10) Patent No.: US 12,466,068 B1
(45) Date of Patent: Nov. 11, 2025

(54) FILTERING OBJECT DETECTION BASED ON AGREEMENT WITH ENVIRONMENT AND RELATED TECHNOLOGY

(71) Applicant: Agility Robotics, Inc., Pittsburgh, PA (US)

(72) Inventors: Robert DeBortoli, Corvallis, OR (US); Brent Griffin, Dexter, MI (US); Anand Rajaraman, Somerville, MA (US)

(73) Assignee: Agility Robotics, Inc., Salem, OR (US)

( * ) Notice: Subject to any disclaimer, the term of this patent is extended or adjusted under 35 U.S.C. 154(b) by 197 days.

(21) Appl. No.: 18/357,625

(22) Filed: Jul. 24, 2023

Related U.S. Application Data

(60) Provisional application No. 63/501,136, filed on May 9, 2023.

(51) Int. Cl.
 *B25J 9/16* (2006.01)
 *B62D 57/032* (2006.01)
(52) U.S. Cl.
 CPC ............. *B25J 9/1679* (2013.01); *B25J 9/163* (2013.01); *B25J 9/1664* (2013.01); *B25J 9/1697* (2013.01); *B62D 57/032* (2013.01)
(58) Field of Classification Search
 None
 See application file for complete search history.

(56) References Cited

U.S. PATENT DOCUMENTS

| | | | | |
|---|---|---|---|---|
| 9,538,892 B2 * | 1/2017 | Fong | ................ | H02J 7/0045 |
| 10,351,346 B2 * | 7/2019 | Otto | .................. | B66F 9/0755 |
| 10,796,151 B2 * | 10/2020 | Lukierski | ............. | G05D 1/0212 |
| 11,144,798 B2 | 10/2021 | Rizzoli et al. | | |
| 2017/0062016 A1 | 3/2017 | Samra et al. | | |
| 2022/0126451 A1 | 4/2022 | Hopkinson et al. | | |

OTHER PUBLICATIONS

"A Fast Stochastic Contact Model for Planar Pushing and Grasping: Theory and Experimental Validation." J Zhou, JA Bagnell, MT Mason. arXiv preprint arXiv:1705.10664 (May 30, 2017).

* cited by examiner

*Primary Examiner* — Jason Holloway
*Assistant Examiner* — Atticus A Cameron

(57) ABSTRACT

A method in accordance with at least some embodiments of the present technology includes generating, by data-processing hardware operably associated with a mobile robot, a putative object estimate. The method further includes determining, by the data-processing hardware, a location of a landmark within a working environment in which the mobile robot operates. The method further includes determining, by the data-processing hardware, an expected object location in the working environment based at least partially on the location of the landmark. The method further includes determining, by the data-processing hardware, a correspondence between the putative object estimate and the expected object location. The method further includes processing, by the data-processing hardware, the putative object estimate based at least partially on the correspondence. Finally, the method includes controlling the mobile robot based at least partially on a result of processing the putative object estimate.

20 Claims, 21 Drawing Sheets

FILTERING OBJECT DETECTION BASED ON AGREEMENT WITH ENVIRONMENT AND RELATED TECHNOLOGY

CROSS-REFERENCE TO RELATED APPLICATION

This claims the benefit of U.S. Provisional Application No. 63/501,136, filed May 9, 2023. The foregoing application is incorporated herein by reference in its entirety. To the extent the foregoing applications or any other material incorporated by reference conflicts with the present disclosure, the present disclosure controls.

TECHNICAL FIELD

The present technology relates to object detection in robotics.

BACKGROUND

Many simple tasks that humans currently perform are amenable to automation using robotics. Among such tasks are those involving moving goods between locations within distribution centers. For example, after a trailer containing goods arrives at a distribution center, human workers may move the goods from the trailer onto conveyors that carry the goods to other locations within the distribution center for further processing. Similarly, although conveyors can be used to deliver outgoing goods to loading docks and to palletizing stations at distribution centers, human workers are still needed to move the goods from the conveyors onto outgoing trailers and pallets. As another example, human workers at order-fulfillment distribution centers are often tasked with retrieving specific goods for last-mile delivery. Modern order-fulfillment distribution centers are massive and handle thousands of different goods. Even with the aid of sophisticated route optimization systems, locating and retrieving specific goods to fill orders as needed is labor intensive. Indeed, it is not uncommon for human workers at order-fulfillment distribution centers to walk ten or more miles a day. Despite the apparent simplicity of loading and unloading trailers and pallets and of retrieving specific goods for last-mile delivery, these tasks have conventionally been difficult or impossible to fully automate.

In the forgoing examples and in other cases, the use of human workers to perform repetitive and time-consuming tasks is inefficient. Human effort would be far better applied to more complex tasks, particularly those involving creativity and advanced problem solving. Presently, however, the need for distribution centers is large and rapidly increasing. Some analysts forecast a shortage of a million or more distribution-center workers within the next ten to fifteen years. Due to the importance of this field, even small improvements in efficiency can have major impacts on macroeconomic productivity. For these and/or other reasons, there is a significant and growing need for innovation that supports automating simple tasks that humans currently perform at distribution centers and elsewhere.

BRIEF DESCRIPTION OF THE DRAWINGS

Certain aspects of the present technology can be better understood with reference to the following drawings. The relative dimensions in the drawings may be to scale with respect to some embodiments of the present technology. With respect to other embodiments, the drawings may not be to scale. The drawings may also be enlarged arbitrarily. For clarity, reference-number labels for analogous components or features may be omitted when the appropriate reference-number labels for such analogous components or features are clear in the context of the specification and all of the drawings considered together. Furthermore, the same reference numbers may be used to identify analogous components or features in multiple described embodiments.

DETAILED DESCRIPTION

Figure 1:
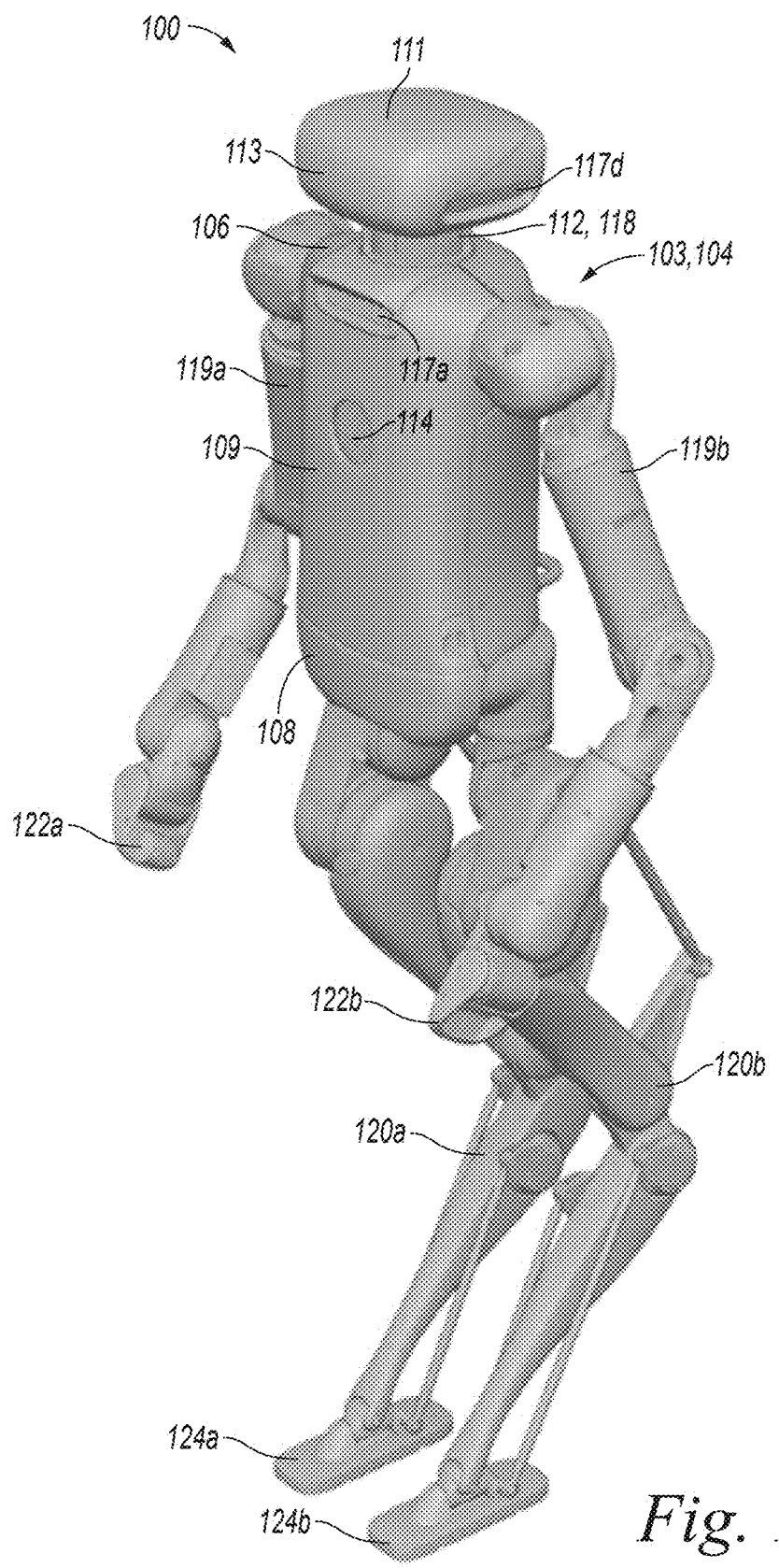
FIGS. 1-3 are, respectively, a first perspective, a second perspective view, and a front profile view of a robot in accordance with at least some embodiments of the present technology.

Humans receive information about the environment via senses, analyze the information, and use the results to control behaviors. This process of sensing and control is also important in robotics. Modern robots are often expected to work in dynamic environments and/or to perform dynamic tasks. This typically necessitates at least some level of sensing and control. Machine learning models are a recent advancement with great promise to facilitate this capability in robots. A typical machine learning model includes a network of interrelated algorithms that generate estimates based on received information. The algorithms analyze new information based on weights and biases that the algorithms refine using training examples. The training examples can be simulated or non-simulated. Simulated training examples are based on data from virtual environments whereas non-simulated training examples are based on data from real-world environments. Given enough training examples, the estimates that machine learning models generate can be highly accurate.

Object detection is a type of sensing with particular relevance to robotics. It involves sensing the presence or absence of objects in an environment, sensing the type of objects in an environment, and/or sensing other object-related information. Robots that move objects between locations, for example, may require the ability to identify the presence of objects to be moved and to distinguish these objects from other objects in an environment with very high accuracy. Unfortunately, the accuracy of conventional object detection, even using advanced machine learning models, is still inadequate for many applications. Moreover, further progress in improving this accuracy is slowing. One standard approach to improving the accuracy of machine learning models is to provide the models with more training examples. The incremental improvement with each additional training example, however, tends to diminish at the high end as use of non-simulated training examples becomes cost prohibitive. Simulated training examples, while inexpensive to generate, have proven in practice to be poorly suited to providing machine learning models that operate robustly in real-world environments. This may be due to errors in the underlying assumptions. More fundamentally, it may suggest that simulations, no matter how sophisticated or numerous, cannot approach parity with the diversity of reality. On the other hand, excessive use of non-simulated training examples is often impractical. Automated processes that call for frequent or continuous human intervention tend to have low marginal economic value over non-automated processes and to have poor scalability.

Devices, systems, and methods in accordance with at least some embodiments of the present technology include one or more innovative features related to object detection and/or use of enhanced object detection to improve the operation of robots. In at least some cases, embodiments of the present technology improve object detection based on machine learning without relying excessively on conventional forms of training. Moreover, these and other embodiments may have the potential to drive such improvement autonomously or near-autonomously, making them highly scalable. A method in accordance with a particular embodiment includes leveraging spatial information about an environment to improve object detection. Expected object locations in an environment can be used to filter estimates from a machine learning model. For example, agreement between an expected object location and an estimate may suggest that the estimate is valid and productive, whereas disagreement may suggest that the estimate is invalid and/or unproductive. The expected object location can be at least partially based on a landmark in an environment. In some cases, a highly reliable localization process, such as one involving detecting an optical fiducial, is used to localize a landmark in an environment. This localization can then be translated with high fidelity to an expected object location. The high fidelity can be due to structural features of the environment. For example, a support structure configured to carry an object may be bolted down or otherwise rendered effectively immovable such that a spatial relationship between the support structure and a landmark does not change easily. Moreover, a landmark used to derive an expected object location can be a support structure itself or an integral portion of a support structure. Furthermore, an object can be positioned and mapped to generate an expected object location directly.

The process of analyzing agreement between an expected object location and an estimate is not trivial. Devices, systems, and methods in accordance with at least some embodiments of the present technology include features related to this analysis. For example, the analysis may include comparing an expected object location and an estimate both in a two-dimensional plane and in a three-dimensional space, with the latter as a further check on an output of the former. Furthermore, various differences between an expected object location and an estimate can be assigned different weights depending on how well these differences distinguish valid and productive estimates from invalid and/or unproductive estimates. Valid and productive estimates can be used to control robot behaviors. Moreover, both valid and productive estimates and invalid and/or unproductive estimates can be passed back to a machine learning model used to generate the estimates. In this way, the machine learning model can improve autonomously or near autonomously even without simulation. As this improvement continues (e.g. as the ratio of valid and productive estimates to invalid and/or unproductive estimates) increases to a given level, the thresholds for determining agreement between an expected object location and an estimate can be tightened to reduce or prevent a diminishment of a pace at which the machine learning model improves its performance relative to a pace at which the machine learning model would otherwise improve its performance in the absence of such tightening. Using this approach, robots deployed in new environments with new confounding variables can quickly train themselves to work reliably with little or no human involvement.

The foregoing and other features of devices, systems, and methods in accordance with various embodiments of the present technology are further described below with reference to FIGS. 1-35. Although methods, devices, and systems may be described herein primarily or entirely in the context of bipedal robots that detect and manipulate totes, other contexts are within the scope of the present technology. For example, suitable features of described methods, devices, and systems can be implemented in the context of object detection for controlling other types of mobile robots (e.g., wheeled, tracked, etc.) or even in the context of object detection for purposes other than controlling robots. Furthermore, suitable features of described methods, devices, and systems can be implemented in the context of detecting objects other than totes, such as boxes, crates, non-packaged hard goods, irregularly shaped objects, door handles, railings, etc. Finally, it should be understood, in general, that other methods, devices, and systems in addition to those disclosed herein are within the scope of the present technology. For example, methods, devices, and systems in accordance with embodiments of the present technology can have different and/or additional configurations, components, procedures, etc. than those disclosed herein. Moreover, methods, devices, and systems in accordance with embodiments of the present technology can be without one or more of the configurations, components, procedures, etc. disclosed herein without deviating from the present technology.

Examples of Robot Systems

Figure 2:
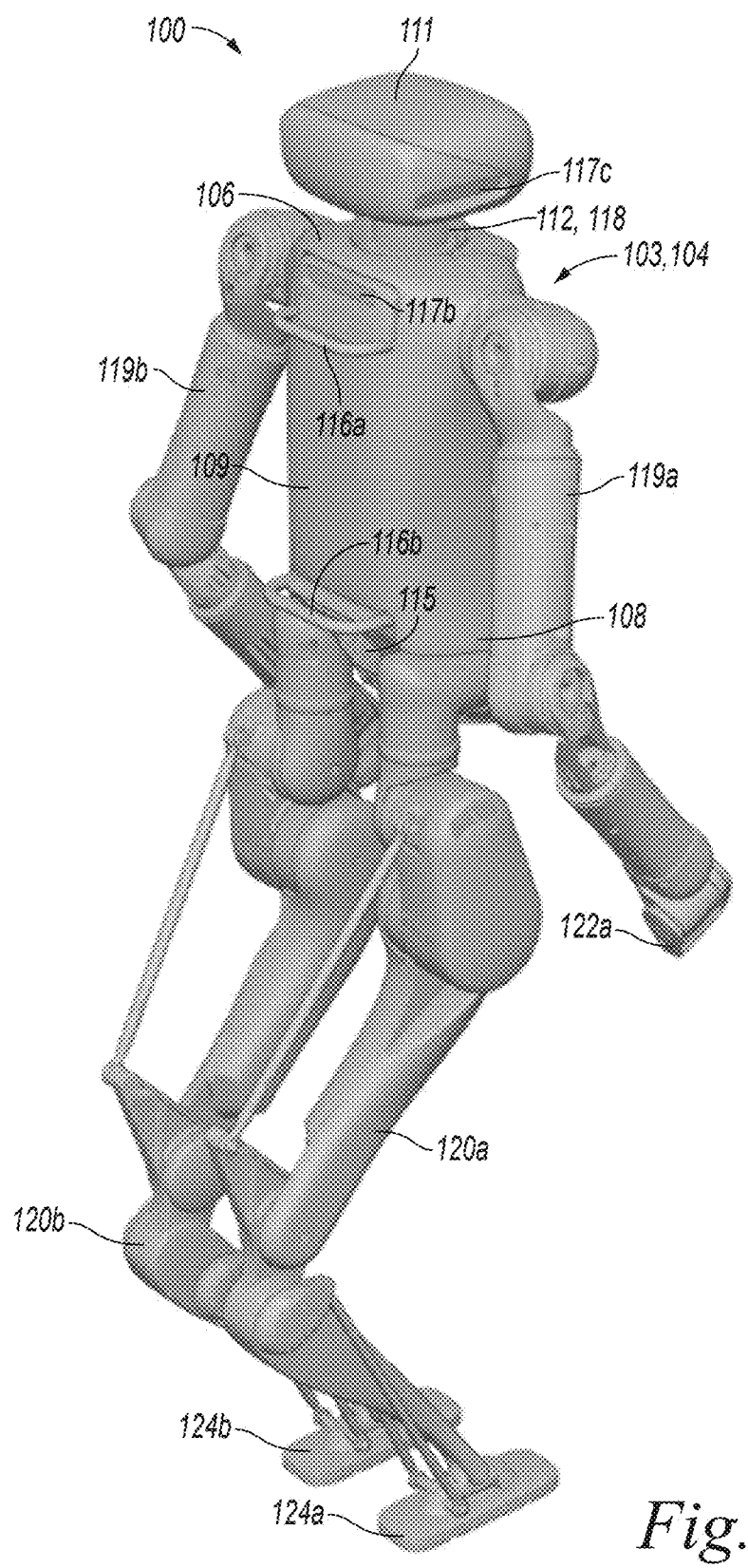
Figure 3:
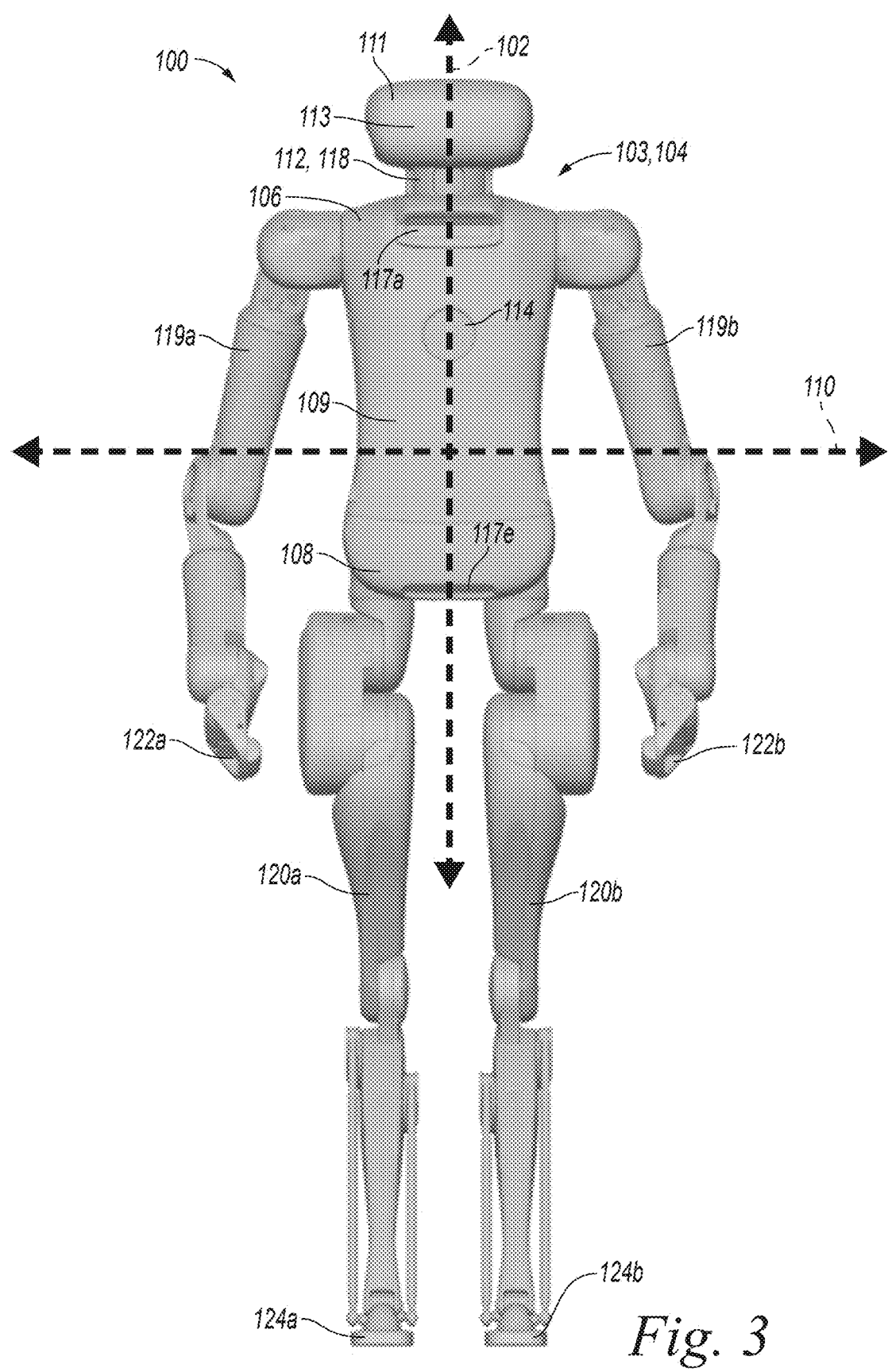

FIGS. 1 and 2 are different perspective views of a robot 100 in accordance with at least some embodiments of the present technology. FIG. 3 is a front profile view of the robot 100. As shown in FIGS. 1-3, the robot 100 can include structures resembling human anatomy with respect to the features, positions, and/or other characteristics of such structures. In at least some cases, the robot 100 defines a midsagittal plane 102 about which the robot 100 is bilaterally symmetrical. In these and other cases, the robot 100 can be configured for bipedal locomotion similar to that of a human. Counterparts of the robot 100 can have other suitable forms and features. For example, a counterpart of the robot 100 can have a non-humanoid form, such as a canine form, an insectoid form, an arachnoid form, or a form with no animal analog. Furthermore a counterpart of the robot 100 can be asymmetrical or have symmetry other than bilateral. Still further, a counterpart of the robot 100 can be configured for non-bipedal locomotion. For example, a counterpart of the robot 100 can be configured for another type of legged locomotion (e.g., quadrupedal locomotion, octopedal locomotion, etc.) and/or non-legged locomotion (e.g., wheeled locomotion, continuous-track locomotion, etc.).

With reference again to FIGS. 1-3, the robot 100 can include a centrally disposed body 103 through which other structures of the robot 100 are interconnected. As all or a portion of the body 103, the robot 100 can include a torso 104 having a superior portion 106, an inferior portion 108, and an intermediate portion 109 therebetween. The robot 100 can define a transverse plane 110 from which the superior and inferior portions 106, 108 of the torso 104 are respectively superiorly and inferiorly spaced apart. The robot 100 can further include a head 111 superiorly spaced apart from the torso 104. The robot 100 can also include a neck 112 through which the head 111 is connected to the torso 104 via the superior portion 106 of the torso 104. The head 111 can have an anteriorly directed display 113. The robot 100 can further include an anteriorly directed audio transmissive window 114 at the intermediate portion 109 of the torso 104, a posteriorly directed exhaust vent 115 at the inferior portion 108 of the torso 104, and handles 116a, 116b extending, respectively, posteriorly from the superior portion 106 of the torso 104 and posteriorly from the inferior portion 108 of the torso 104.

The robot 100 can still further include elongate sensor bays 117 (individually identified as elongate sensor bays 117a-117e) carried by the torso 104 and the head 111. The sensor bays 117a, 117b can be at the superior portion 106 of the torso 104 and anteriorly and posteriorly directed, respectively. The sensor bays 117c, 117d can be at opposite respective sides of the head 111 and can be directed in opposite respective lateral directions. The sensor bay 117e can be at the inferior portion 108 of the torso 104 and directed anteriorly and inferiorly toward a ground level in front of the robot 100. The robot 100 can further include a cylindrical sensor bay 118 at the neck 112. At the elongate sensor bays 117a-117e and the cylindrical sensor bay 118, the robot 100 can include perception sensors (not shown) through which the robot 100 can receive information about an environment in which it operates. The perception sensors can emit and/or receive optical, audio, electromagnetic, and/or other types of signals. Examples of suitable perception sensors include cameras (e.g., RGB cameras, infrared cameras, stereoscopic cameras, etc.), vision sensors, light detection and ranging (LIDAR) sensors, and sound navigation and ranging (SONAR) sensors. In a particular example, the robot 100 includes cameras at the elongate sensor bays 117a-117e and a LIDAR sensor at the cylindrical sensor bay 118.

The robot 100 can further include articulated appendages carried by the torso 104. Among these articulated appendages, the robot 100 can include arms 119a, 119b and legs 120a, 120b. At the individual articulations of the arms 119a, 119b and legs 120a, 120b, the robot 100 can include a joint and corresponding actuator (e.g., a rotary actuator). For clarity of illustration the joints and actuators are not labeled with reference numbers in FIGS. 1-3. In at least some cases, the robot 100 is configured to manipulate objects via the arms 119a, 119b, such as bimanually. In these and other cases, the robot 100 can be configured to ambulate via the legs 120a, 120b, such as bipedally. The arms 119a, 119b and the legs 120a, 120b can define kinematic chains. In at least some cases, the kinematic chains corresponding to the arms 119a, 119b provide at least five degrees of freedom, such as exactly five or exactly six degrees of freedom. In these and other cases, the kinematic chains corresponding to the legs 120a, 120b can provide at least four degrees of freedom, such as exactly four, exactly five, or exactly six degrees of freedom. As parts of the arms 119a, 119b, the robot 100 can include end effectors 122a, 122b at distalmost portions of the corresponding kinematic chains. Similarly, as parts of the legs 120a, 120b, the robot 100 can include feet 124a, 124b at distalmost portions of the corresponding kinematic chains. In the illustrated embodiment, the end effectors 122a, 122b and the feet 124a, 124b are not articulated. In other embodiments, counterparts of some or all of the end effectors 122a, 122b and the feet 124a, 124b can be articulated, such as with one or more movable fingers or toes.

Examples of Electrical and Computer Systems

Figure 4:
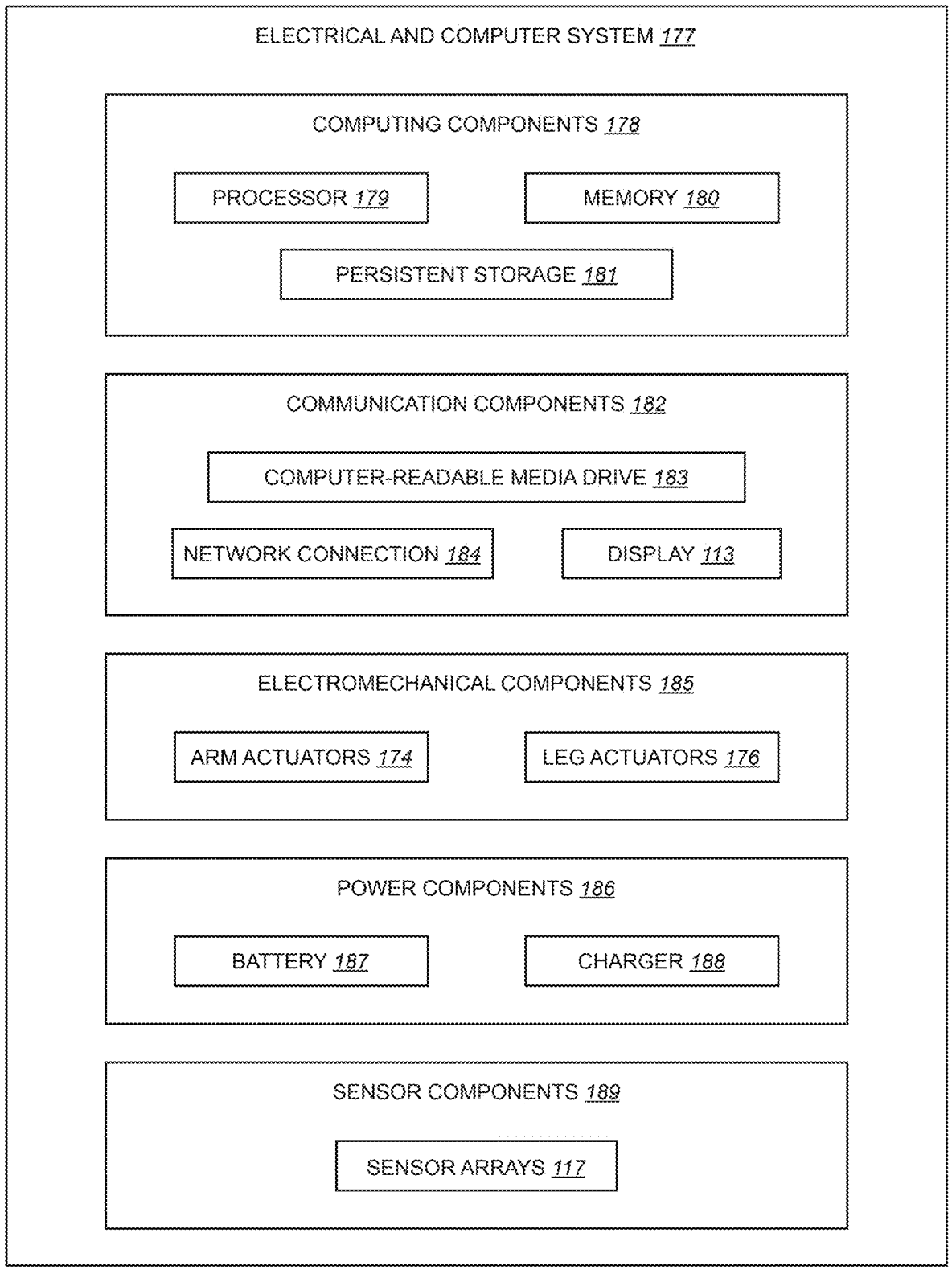
FIG. 4 is a block diagram corresponding to an electrical and computer system of the robot of FIGS. 1-3.

FIG. 4 is a block diagram illustrating an electrical and computer system 177 of the robot 100. When suitable, operations described elsewhere in this disclosure (e.g., data operations, movements of the robot 100, etc.) can be implemented via this electrical and computer system 177 autonomously and/or in response to instructions from a user. As shown in FIG. 4, the electrical and computer system 177 can include computing components 178. The computing components 178 can include a processor 179, such as one or more general-purpose and/or special-purpose integrated circuits including digital logic gates for executing programs and/or for otherwise processing data. The computing components 178 can further include memory 180, such as one or more integrated circuits for storing data in use. The memory 180 can include a multithreaded program, an operating system including a kernel, device drivers, etc. The computing components 178 can further include persistent storage 181, such as a hard drive for persistently storing data. Examples of data that can be stored by the persistent storage 181 include diagnostic data, sensor data, configuration data, environmental data, and current-state data. The computing components 178 can collectively define a computer configured to manage, control, receive information from, deliver information to, and/or otherwise usefully interact with other components of the electrical and computer system 177.

The electrical and computer system 177 can further include communication components 182. The communication components 182 can include a computer-readable media drive 183 for reading computer programs and/or other data stored on computer-readable media. As one example, the computer-readable media drive 183 can be a flash-memory drive. The communication components 182 can further include a network connection 184 for connecting the robot 100 to other devices and systems, such as other robots and/or other computer systems. The network connection 184 can be wired and/or wireless and can be via the Internet, a Local Area Network (LAN), a Wide Area Network (WAN), BLUETOOTH, WiFi, a cell phone network, etc. The network connection 184 can include networking hardware, such as routers, switches, transmitters, receivers, computer-readable transmission media, etc. The communication components 182 can further include the display 113 discussed above and/or other suitable components for communicating with a user. The robot 100 can use the communication components 182 for internal operations and/or to interact with devices and/or systems external to the robot 100, such as systems for providing contextual information about the environment in which the robot 100 operates and/or systems for changing operating conditions of the robot 100.

The electrical and computer system 177 can further include electromechanical components 185. The electromechanical components 185 can include the actuators discussed above and/or other suitable components for implementing mechanical action within the robot 100. The electrical and computer system 177 can further include power components 186. The power components 186 can include a battery 187 and a charger 188. The battery 187 can be a lithium-ion battery, a lead-acid battery, or another suitable type. The charger 188 can include a connector (not shown) compatible with a power source (e.g., a wall outlet) and leads (also not shown) extending between the connector and the battery 187. In at least some cases, the robot 100 is configured to operate wirelessly via the battery 187 and to recharge occasionally via the charger 188.

Finally, the electrical and computer system 177 can include sensor components 189 for capturing, providing, and/or analyzing information about the robot 100 itself and/or the environment in which the robot 100 is operating. The sensor components 189 can include the examples of sensors at the elongate sensor bays 117a-117e and the cylindrical sensor bay 118 discussed above. At these and/or at one or more other suitable locations, the robot 100 can include among the sensor components 189 a light sensor (e.g., a photoresistor), a sound sensor (e.g., a microphone), a location sensor (e.g., using the Global Positioning System), a three-dimensional sensor, and/or a proximity sensor, among other examples. Within the body 103 and/or at one or more other suitable locations, the robot 100 can include among the sensor components 189 an accelerometer, a gyroscope, a magnetometer, and/or a tilt sensor, among other examples. At the end effectors 156a, 156b and/or at one or more other suitable locations, the robot 100 can include among the sensor components 189 a contact sensor and/or a force sensor, among other examples. In at least some cases, two or more different types of sensors are incorporated into a sensor assembly. For example, an accelerometer, a gyroscope, and a magnetometer can be incorporated into an inertial measurement unit through which the robot 100 can determine acceleration, angular velocity, and orientation.

At one, some, or all of the actuators of the robot 100 and/or at one or more other suitable locations, the robot 100 can include among the sensor components 189 sensors that measure properties of the corresponding joints. Such properties can include position, orientation (e.g., yaw, pitch, and roll), applied force (e.g., torque), elevation, mass, velocity, and acceleration, among other examples. The measurements of these properties can be direct or indirect. As an example of direct sensing, the robot 100 may sense a torque acting on a given joint via a torque sensor operably associated with the joint. As an example of indirect sensing, the robot 100 may sense a position of a given one of the end effectors 122a, 122b based on perception data corresponding to the given one of the end effectors 122a, 122b and other perception data corresponding to a reference. The robot 100 can include one or more sensors in a sensor system, such as a vision system, a light detection and ranging (LIDAR) system, a stereoscopic camera system, a sound navigation and ranging (SONAR) system, etc. In at least some cases, the robot 100 monitors itself and/or its environment in real-time or in near real-time. Moreover, the robot 100 may use acquired sensor data as a basis for decision-making via the computing components 178.

Components of the electrical and computer system 177 can be connected to one another and/or to other components of the robot 100 via suitable conductors, transmitters, receivers, circuitry, etc. While the electrical and computer system 177 configured as described above may be used to support operation of the robot 100, it should be appreciated that the robot 100 may be operated using devices of various types and configurations and that such devices may have various components and levels of responsibility. For example, the robot 100 may employ individual computer systems or controllers to manage discrete aspects of its operations, such as an individual computer system or controller to perform computer vision operations, a separate computer system or controller to perform power management, etc. In some cases, the robot 100 employs the electrical and computer system 177 to control physical aspects of the robot 100 according to one or more designated rules encoded in software. For example, these rules can include minimums and/or maximums, such as a maximum degree of rotation for a joint, a maximum speed at which a component is allowed to move, a maximum acceleration rate for one or more components, etc. The robot 100 may include any number of mechanical aspects and associated rules, which may be based on or otherwise configured in accordance with the purpose of and/or functions performed by the robot 100.

Software features of the robot 100 may take the form of computer-executable instructions, such as program modules executable by the computing components 178. Generally, program modules include routines, programs, objects, components, data structures, and/or the like configured to perform particular tasks or to implement particular abstract data types and may be encrypted. Furthermore, the functionality of the program modules may be combined or distributed as desired in various examples. Moreover, control scripts may be implemented in any suitable manner, such as in C/C++ or Python. The functionality of the program modules may be combined or distributed in various embodiments, including cloud-based implementations, web applications, mobile applications for mobile devices, etc.

Furthermore, certain aspects of the present technology can be embodied in a special purpose computer or data processor, such as application-specific integrated circuits (ASIC), digital signal processors (DSP), field-programmable gate arrays (FPGA), graphics processing units (GPU), many core processors, etc. specifically programmed, configured, or constructed to perform one or more computer-executable instructions. While aspects of the present technology, such as certain functions, may be described as being performed on a single device, these aspects, when suitable, can also be practiced in distributed computing environments where functions or modules are shared among different processing devices linked through a communications network such as a Local Area Network (LAN), Wide Area Network (WAN), or the Internet. In a distributed computing environment, program modules and other components may be located in both local and remote memory storage and other devices, which may be in communication via one or more wired and/or wireless communication channels.

Aspects of the present technology may be stored or distributed on tangible computer-readable media, which can include volatile and/or non-volatile storage components, such as magnetically or optically readable computer media, hard-wired or preprogrammed chips (e.g., EEPROM semiconductor chips), nanotechnology memory, biological memory, or other computer-readable storage media. Alternatively, computer-implemented instructions, data structures, screen displays, and other data under aspects of the present technology may be distributed (encrypted or otherwise) over the Internet or over other networks (including wireless networks), on a propagated signal on a propagation medium (e.g., electromagnetic wave(s), sound wave(s), etc.) over a period of time, or they may be provided on any analog or digital network (packet switched, circuit switched, or other scheme). Furthermore, the term computer-readable storage medium does not encompass signals (e.g., propagating signals) or transitory media. One of ordinary skill in the art will recognize that various components of the robot 100 may communicate via any number of wired and/or wireless communication techniques and that elements of the robot 100 may be distributed rather than located in a single monolithic entity. Finally, electrical and computing aspects of robots in accordance with various embodiments of the present technology may operate in environments and/or according to processes other than the environments and processes described above.

Examples of Software Architecture

Figure 5:
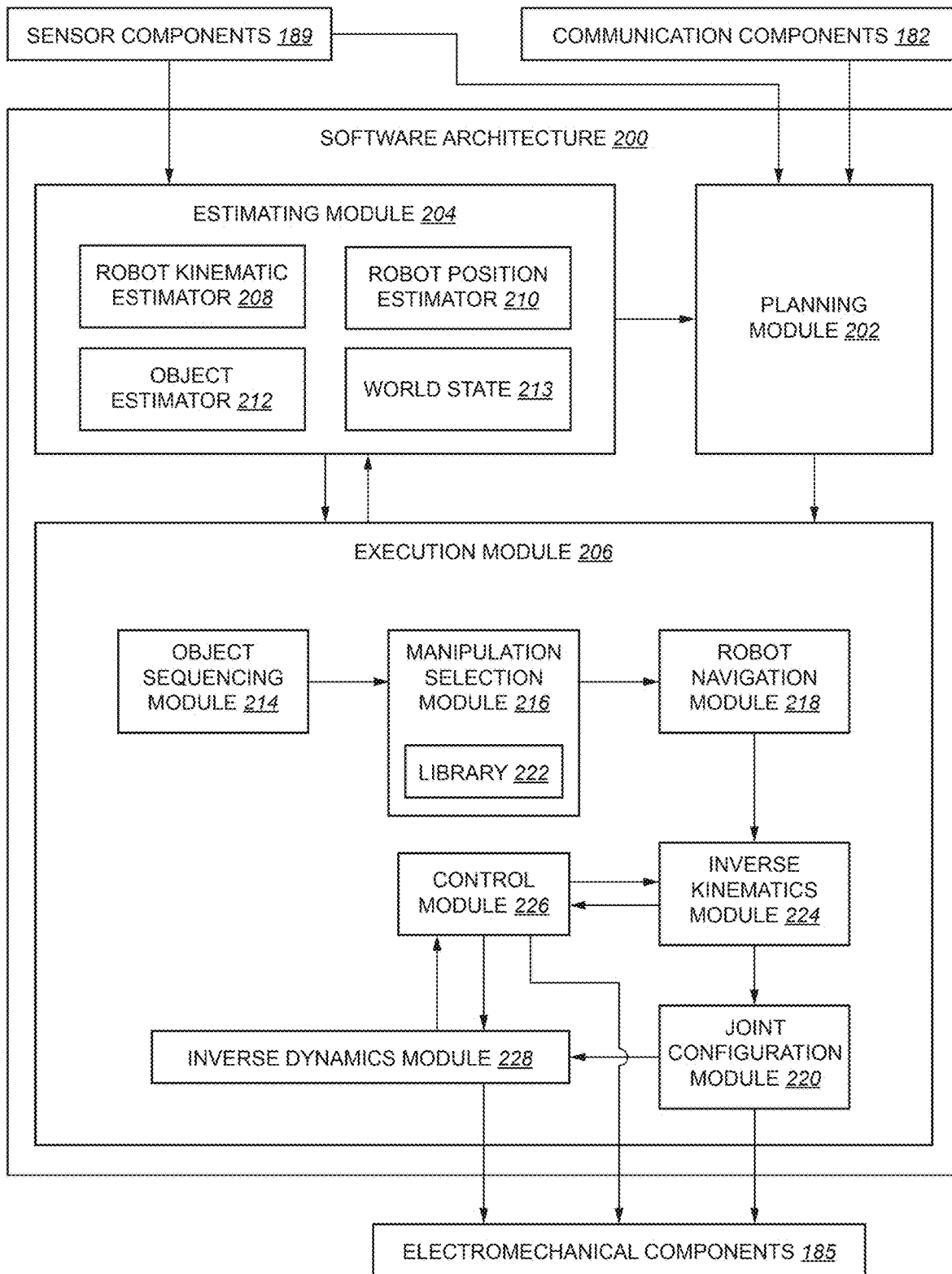
FIG. 5 is a block diagram corresponding to a software architecture and associated portions of the electrical and computer system of FIG. 4.

FIG. 5 is a block diagram corresponding to a software architecture 200 and associated portions of the electrical and computer system 177. The software architecture 200 can be within the software features of the electrical and computer system 177. With reference to FIGS. 4 and 5 together, the software architecture 200 can include a planning module 202, an estimating module 204, and an execution module 206 operably associated with one other. The planning module 202 can be configured to relay or to generate a plan corresponding to an objective for the robot 100 (e.g., unload all objects on a shelf, retrieve an object from a first location and move the object to a second location, etc.). In at least some cases, the planning module 202 receives information from the communication components 182 and relays or generates a plan based at least partially on the received information. For example, the planning module 202 may receive a command from a user via the communication components 182 and relay the command as a plan. As another example, the planning module 202 may receive a command from a user via the communication components 182 and generate a plan related to the command. As yet another example, the planning module 202 may generate a plan without receiving a command from a user, such as at a predetermined time or in response to information about a current state of the robot 100 or the environment received via the sensor components 189.

The estimating module 204 can receive information from the sensor components 189 and can generate estimates in real time or in near real time to inform generating and/or executing a plan. The estimating module 204 can include a robot kinematic estimator 208, a robot position estimator 210, an object estimator 212, and a world state 213. The robot kinematic estimator 208 can generate an estimate of a current kinematic state of the robot 100 (e.g., balanced, off-balance, walking, standing, etc.) and estimates of positions of individual joints of the robot 100. The robot position estimator 210 can generate a current estimate of a position of the robot 100 within an environment. This position can be a set of coordinates and can be based on perception information, GPS information, and/or other information received or generated by the robot 100. Perception information potentially relevant to the position of the robot 100 includes, among other examples, information corresponding to distances between the robot 100 and landmarks in an environment and information corresponding to fiducial markings carried by or otherwise associated with the landmarks. This information can be detected, for example, via a three-dimensional sensor of the robot 100 and/or via a camera of the robot 100. Furthermore, information can move between components of the estimating module. For example, the world state 213 can receive information from the robot kinematic estimator 208, the robot position estimator 210, and the object estimator 212. In addition or alternatively, the object estimator 212 can receive information from the robot kinematic estimator 208 and the robot position estimator 210 directly.

The object estimator 212 can generate a current estimate of a position of a manipulatable object (e.g., a tote) within an environment. As with the position of the robot, the position of an object can be a set of coordinates and can be based on perception information, GPS information, and/or other information received or generated by the robot 100. Perception information potentially relevant to the position of an object includes, among other examples, information corresponding to distances between the object and the robot 100, distances between the object and landmarks in an environment, information corresponding to fiducial markings carried by or otherwise associated with the object. This information can be detected, for example, via a three-dimensional sensor of the robot 100 and/or via a camera of the robot 100. In at least some cases, the object estimator 212 uses information (e.g., sensor poses) from the robot kinematic estimator 208 and/or the robot position estimator 210 to inform generation of object estimates. This can be useful, for example, when a fiducial marking or other landmark in an environment is not visible. Details of the object estimator 212 are further described below with reference to FIG. 6. In at least some cases, the object estimator 212 is configured to update the world state 213 with objects, support structure, and/or other information relevant to objects in an environment in which the robot 100 operates.

The execution module 206 can be configured to receive a plan from the planning module 202 and estimates from the estimating module 204. The execution module 206 can include an object sequencing module 214, a manipulation selection module 216, a robot navigation module 218, and a joint configuration module 220. The planning module 202 can be configured to send a plan to the object sequencing module 214, to the manipulation selection module 216, to the robot navigation module 218, or to the joint configuration module 220 based on attributes of the plan. For example, when a plan includes explicit instructions for positions of the electromechanical components 185, the planning module 202 can send the plan to the execution module 206 via the joint configuration module 220. As another example, when a plan does not involve manipulating an object, the planning module 202 can send the plan to the execution module 206 via the robot navigation module 218. As yet another example, when a plan concerns only one object and the object is remote to the robot 100, the planning module 202 can send the plan to the execution module 206 via the manipulation selection module 216. As a final example, when a plan concerns multiple objects remote to the robot 100, the planning module 202 can send the plan to the execution module 206 via the object sequencing module 214.

The object sequencing module 214 can receive one or more estimates from the estimating module 204 and can generate a sequence in which multiple objects are to be manipulated. For example, when the object sequencing module 214 receives a plan to unload a shelf, the object sequencing module 214 can query the estimating module 204 for current locations of objects on the shelf. The object sequencing module 214 can then assign the objects an order, convert the order into a queue, and pass the queue to the manipulation selection module 216. The manipulation selection module 216 can include a library 222 including two or more different motion sequences that can be used to manipulate an object. The manipulation selection module 216 can select a motion sequence for a given object based on information, such as information about the object and/or information about the environment. The robot navigation module 218 can generate targets for different parts of the robot 100 further to a plan or to a portion of a plan being executed. Examples of targets include positions of the feet 124a, 124b in the environment, positions of the end effectors 122a, 122b in the environment, etc. The robot navigation module 218 can update these targets continuously or near continuously based on information from the estimating module 204. The execution module 206 can further include an inverse kinematics module 224 that translates the targets from the robot navigation module 218 into joint configurations throughout the robot 100.

The execution module 206 can also include a control module 226 that receives joint configurations from the inverse kinematics module 224 and generates joint parameters (e.g., positions, velocities, accelerations, etc.) to be executed by the robot 100 to achieve these joint configurations. Through continuous or near-continuous communication with the inverse kinematics module 224, the control module 226 can modify the joint parameters to at least partially compensate for deviations as the robot 100 executes the joint configurations. The inverse kinematics module 224 can send other joint configurations not subject to active control to the joint configuration module 220. Similar to the control module 226, the joint configuration module 220 can generate joint parameters (e.g., positions, velocities, accelerations, etc.) to be executed by the robot 100 to achieve joint configurations received from the inverse kinematics module 224 or from the planning module 202.

Finally, the execution module 206 can include an inverse dynamics module 228 that receives joint parameters from the control module 226 and from the joint configuration module 220. The inverse dynamics module 228 can track a desired wrench of the robot 100 and its relationship with objects in the environment. In at least some cases, the inverse dynamics module 228 references a map of robot positions and wrenches to joint torques. Based at least partially on the tracking, the inverse dynamics module 228 can modify the joint parameters to achieve a desired result. For example, the inverse dynamics module 228 can modify the joint parameters to maintain contact between the end effectors 122a, 122b and an object as the robot 100 carries the object. The inverse dynamics module 228 can then send modified joint parameters to the electromechanical components 185 for execution. For configurations that do not involve a dynamic interaction with the environment, the control module 226 and the joint configuration module 220 can send joint parameters directly to the electromechanical components 185 for execution.

Figure 6:
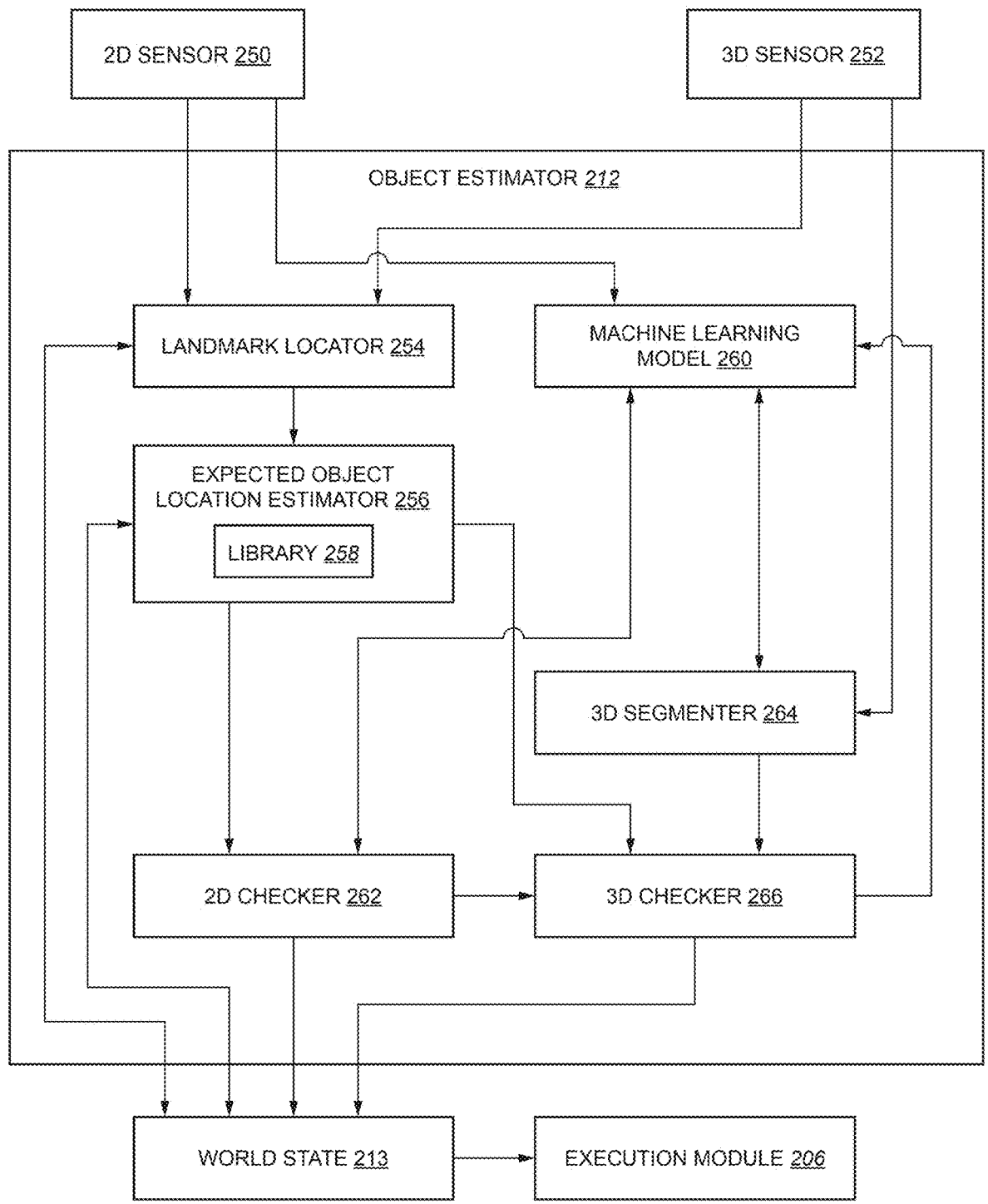
FIG. 6 is a block diagram corresponding to an object estimator of the software architecture of FIG. 5 and associated portions of the electrical and computer system of FIG. 4.

FIG. 6 is a block diagram corresponding to the object estimator 212 and associated portions of the electrical and computer system 177. As shown in FIG. 6, the electrical and computer system 177 can include a two-dimensional sensor 250 and a three-dimensional sensor 252 among the sensor components 189. The object estimator 212 can receive two-dimensional data (e.g., image data) and three-dimensional data (e.g., depth data) from the two-dimensional sensor 250 and the three-dimensional sensor 252, respectively. The object estimator 212 can include a landmark locator 254 configured to localize a landmark in an environment. For example, the landmark locator 254 can include AprilTag tracking software and/or simultaneous localization and mapping (SLAM) software. The object estimator 212 can further include an expected object location estimator 256 configured to determine an expected object location at least partially based on output from the landmark locator 254. The expected object location estimator 256 can include a library 258 containing structure data (e.g., CAD data) for one or more structures relevant to determining an expected object location. Examples of structure data include CAD models for support structures (e.g., racks, shelves, tables, etc.) and CAD models for objects to be detected (e.g., totes, boxes, crates, etc.).

The object estimator 212 can further include a machine learning model 260. In a particular example, the machine learning model 260 is Detectron2 (Facebook AI Research) with Mask R-CNN implementation. The object estimator 212 can also include a two-dimensional checker 262 configured to process output from the expected object location estimator 256 and the machine learning model 260. The two-dimensional checker 262 can include software configured to perform functions such as projecting expected object locations from the expected object location estimator 256 onto image data from the two-dimensional sensor 250, calculating bounding boxes for the projected expected object locations, and calculating intersections between areas of the bounding boxes and areas of putative object estimates from the machine learning model 260.

The two-dimensional checker 262 can be configured to work at least primarily with two-dimensional data from the two-dimensional sensor 250. In contrast, the object estimator 212 can include a three-dimensional segmenter 264 and a three-dimensional checker 266 configured to work at least primarily with three-dimensional data from the three-dimensional sensor 252. The three-dimensional segmenter 264 can be configured to segment the three-dimensional data into segments corresponding to the putative object estimates from the machine learning model 260. The three-dimensional checker 266 can be configured to perform functions such as generating derivatives (e.g., centroids) based on these segments and comparing the derivatives to expected object locations. Together or separately, the two-dimensional checker 262 and the three-dimensional checker 266 can be used to filter output from the machine learning model 260 and to eliminate most or all invalid and/or unproductive portions of the output. The object estimator 212 can update the world state 213 with the filtered output, which can then be made available to the execution module 206 for use in controlling the robot 100. The object estimator 212 can also use output from the two-dimensional checker 262 and/or the three-dimensional checker 266 to train the machine learning model 260.

Examples of Methods

Figure 7:
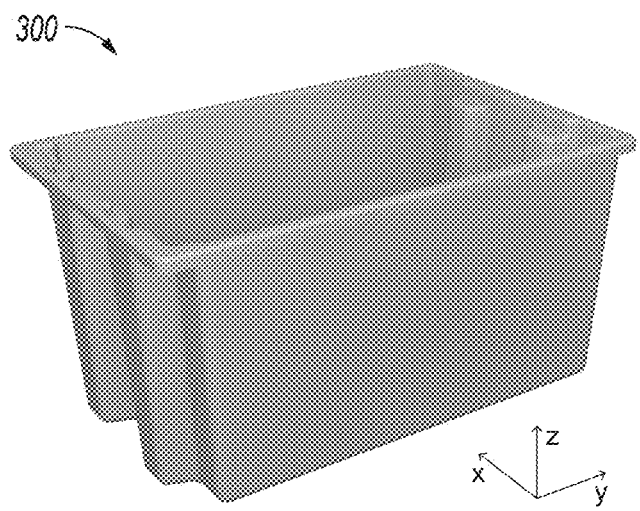
FIG. 7 is a perspective view of an object that the robot of FIGS. 1-3 is capable of manipulating.
Figure 8:
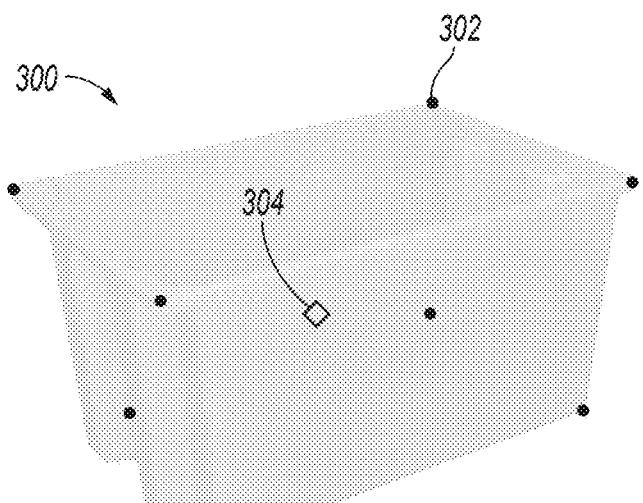
FIG. 8 is a perspective view of the object of FIG. 7 and representations of features of the object.

Methods in accordance with at least some embodiments of the present technology may be described in this section in the context of an object 300 as shown in FIGS. 7 and 8. With reference to FIGS. 7 and 8, the object 300 can be fungible. This is common, for example, among plastic totes used in modern distribution centers. These totes are often made from molds in large quantities such that very little variation exists from one tote to another. Reference herein to objects 300 contemplates the object 300 and other objects of the same or similar shape. The objects 300 can define shape features relevant to determining expected object locations. For example, the objects 300 can define corners 302 (shown as dots in FIG. 8). Other potentially useful shape features of the object 300 include edges and surfaces. The objects 300 can also define centroids 304 (shown as a diamond in FIG. 8). The centroids 304, for example, can be at the average width, average height, and average depth of the object 300, among other forms of this metric. The corners 302 and centroids 304 can individually correspond to respective sets of coordinates in a three-dimensional space. In the illustrated case, the objects 300 are totes defining openings through which they can be loaded and unloaded. In other cases, counterparts of the objects 300 can have another suitable form. For example, counterparts of the objects 300 can be boxes, unpackaged hardgoods, lidded totes, etc.

Figure 9:
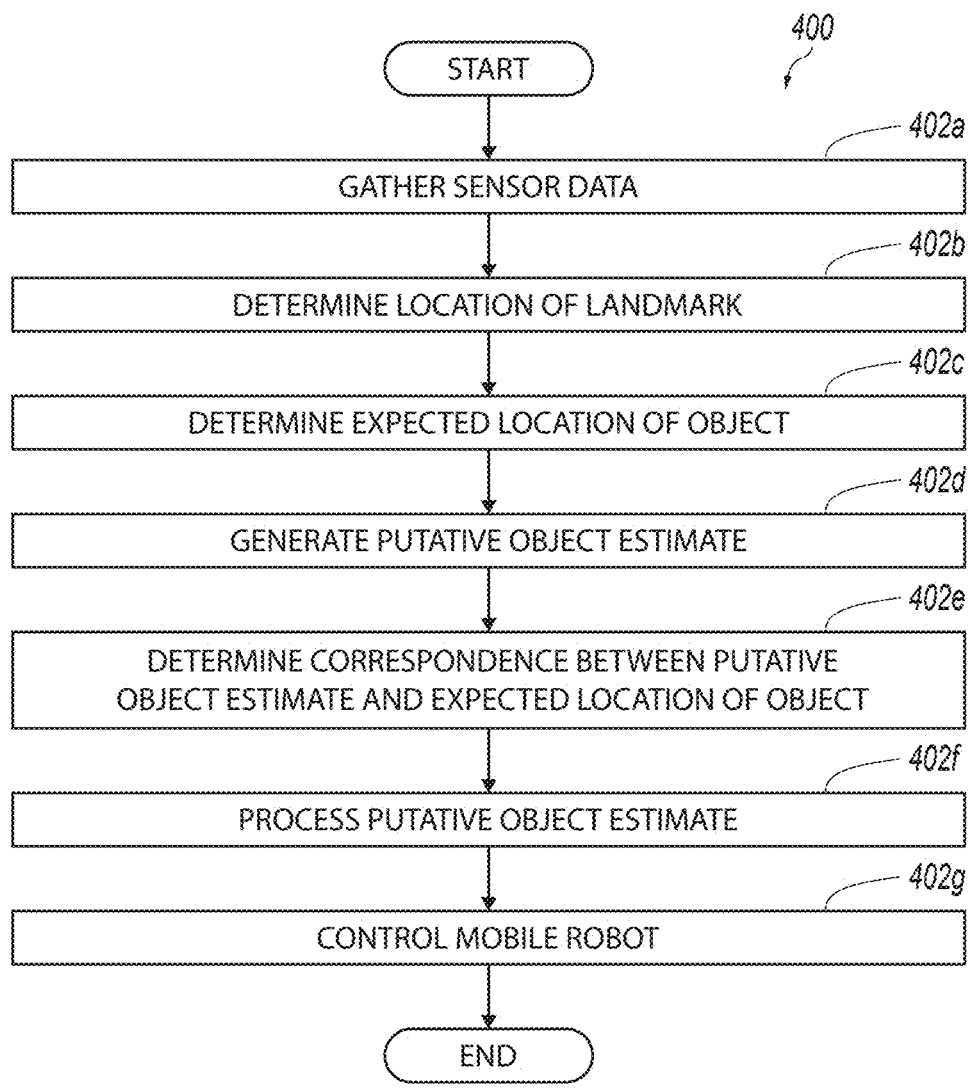
FIG. 9 is a block diagram corresponding to a method in accordance with at least some embodiments of the present technology.

FIG. 9 is a block diagram corresponding to a method 400 in accordance with at least some embodiments of the present technology. The diagram includes blocks 402a-402g corresponding to different respective portions of the method 400. The method 400 can include gathering sensor data (block 402a) corresponding to a working environment in which the robot 100 operates. In at least some cases, the sensor data includes two-dimensional data (e.g., image data) gathered by the two-dimensional sensor 250. In addition or alternatively, the sensor data can include three-dimensional data (e.g., depth data) gathered by the three-dimensional sensor 252. The three-dimensional data can be in the form of a point cloud (e.g., a depth map). Other types and forms of sensor data are also possible. The sensor data can be gathered and processed in timesteps at a suitable frequency that balances adaptability and responsiveness with utilization of computing resources and/or other factors. For example, timesteps of sensor data can be gathered and processed at a frequency within a range from 2 Hertz to 20 Hertz, such as within a range from 3 Hertz to 10 Hertz. Operations described herein regarding processing sensor data can be executed on sensor data from one, some, or all timesteps in a time window. Furthermore, operations described herein may depend on agreement, averaging, and/or other processing of sensor data gathered at different timesteps (e.g., at successive or non-successive timesteps).

Figure 10:
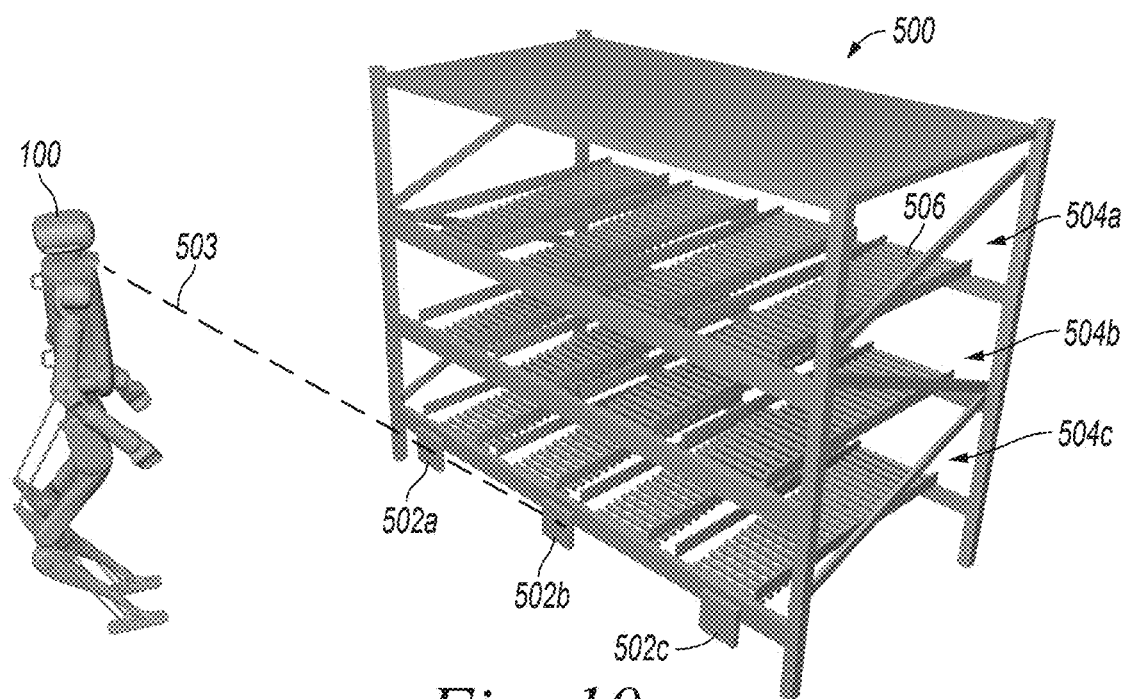
FIG. 10 is a perspective view of the robot of FIGS. 1-3 and a support structure at a time during an embodiment of the method of FIG. 9.
Figure 11:
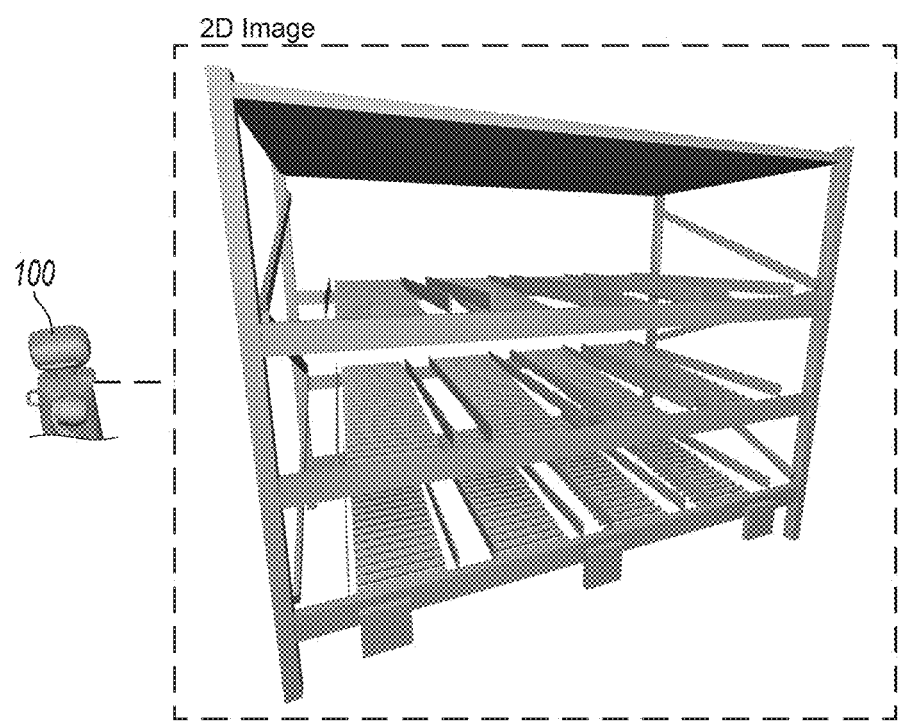
FIG. 11 is a representation of two-dimensional input to the robot of FIGS. 1-3 at the time corresponding to FIG. 10.
Figure 12:
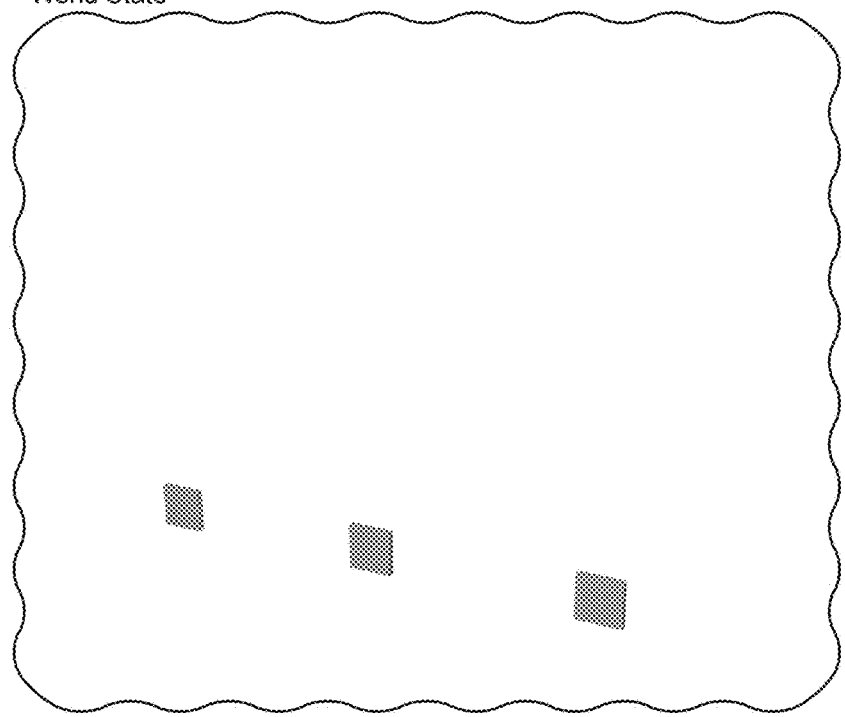
FIG. 12 is a representation of fiducials associated with the support structure of FIG. 10 in a world state of the software architecture of FIG. 5.

FIG. 10 is a perspective view of the robot 100 and a support structure 500 at a time during an embodiment of the method 400. FIG. 11 is a representation of two-dimensional input to the robot 100 at the time corresponding to FIG. 10. With reference to FIGS. 1-11 together, the method 400 can include determining a location of a landmark within the working environment (block 402b). This can be based at least partially on gathered sensor data (e.g., two-dimensional data and/or three-dimensional data). In at least some cases the landmark is spatially fixed relative to an expected object location. As shown in FIG. 10, the working environment can include fiducials 502 (individually identified as fiducials 502a-502c) carried by the support structure 500 (e.g., integrally connected to the support structure 500). The fiducials 502a-502c can be AprilTags or another type of structure that the robot 100 is able to localize with high accuracy. In FIG. 10, dashed line 503 indicates perception of the fiducial 502b. Given a known size, identification, and position on the support structure 500, the landmark locator 254 can use an image of the fiducial 502b to localize the fiducial 502b and the support structure 500 accurately in three dimensional space. The landmark can be one, some, or all of the fiducials 502a-502c. Furthermore, the landmark can be the support structure 500 itself and/or another structure in the working environment alone or together with one, some, or all of the fiducials 502a-502c. In these and other cases, localizing the landmark can be at least partially via SLAM (simultaneous localization and mapping).

The support structure 500 can include vertically distributed tiers 504 (individually identified as tiers 504a-504c). At the respective tiers 504a-504c, the support structure 500 can define bays 506 (one labeled in FIG. 10). At each of the bays 506, the support structure 500 can be configured to carry one or two of the objects 300. In the illustrated case, the support structure 500 is a rack configured to carry the objects 300 at respective positions in which movement of the objects 300 is constrained both laterally and vertically. For example, after a human or robot worker loads a given one of the objects 300 into a given one of the bays 506, structural features of the bay (e.g., the floor slope, the sidewall placements, etc.) can urge the object 300 toward a predetermined position. The predetermined position can correspond to an expected object location. In other cases, a counterpart of the support structure 500 can be configured to constrain objects in a similar manner, but have a different form. In still other cases, a counterpart of the support structure 500 can be configured to carry objects at respective positions in which movement of the objects is less constrained (e.g., only laterally or only vertically). In these and other cases, ranges or sets of expected object locations can be arranged according to the nature of the constraint. For example, when a counterpart of the support structure 500 is a conveyor with longitudinal rails, expected object locations can overlap one another longitudinally in a row between the rails.

Figure 13:
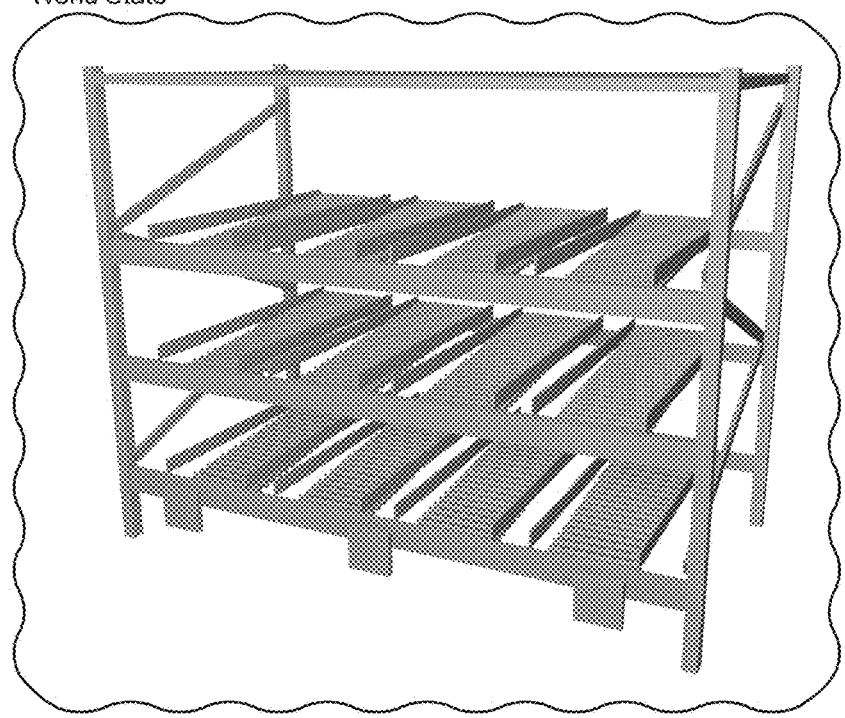
FIG. 13 is a representation of a model of the support structure of FIG. 10 in the world state of the software architecture of FIG. 5.
Figure 14:
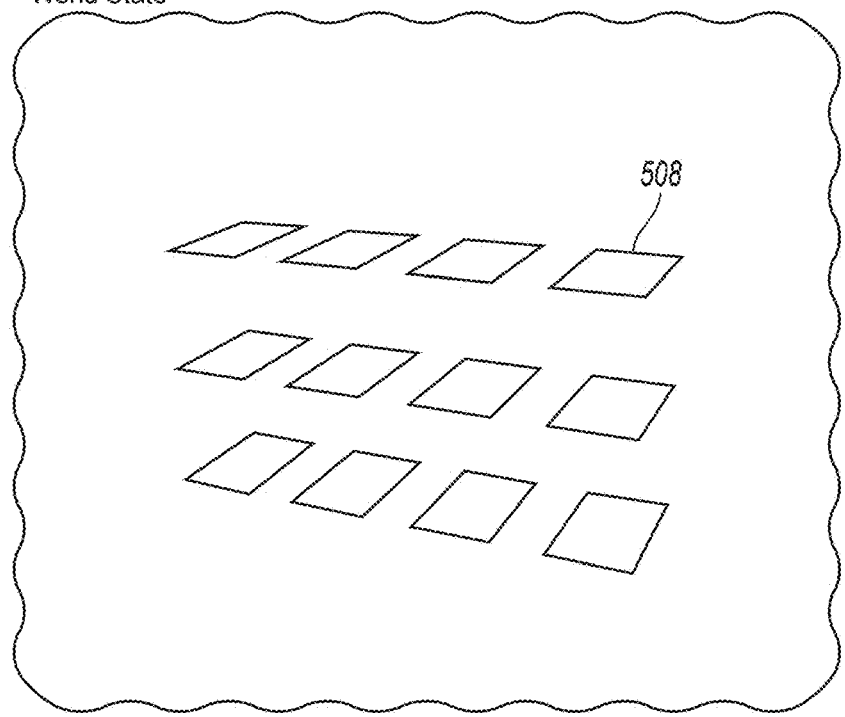
FIG. 14 is a representation of support patches corresponding to expected object locations in the world state of the software architecture of FIG. 5.

FIGS. 12-17 are representations of information in the world state 213. Together, these figures indicate a progression of information added to the world state 213 based on localization of the fiducials 502. With reference now to FIGS. 1-17 together, the landmark in the method 400 can encompass the fiducials 502 collectively. For example, the software architecture 200 (e.g., via the landmark locator 254) can localize the fiducials 502a-502c individually and then average the results. Based at least partially on this average, the software architecture 200 (e.g., via the expected object location estimator 256) can add a model of the support structure 500 to the world state 213 as shown in FIG. 13. The software architecture 200 (e.g., via the expected object location estimator 256) can access the model of the support structure 500 from the library 258 and register the model with a location of the fiducials 502 in the world state 213. Next, the software architecture 200 (e.g., via the landmark locator 254) can add support patches 508 to the world state 213 as shown in FIG. 14. The support patches 508 can correspond to floors of the individual bays 506 where the support structure 500 is configured to carry front rows of the objects 300. As discussed above, the support structure 500 can constrain the positions of the objects 300 such that dimensions of the support patches 508 correspond closely to individual footprints of the objects 300 when carried by the support structure 500. In other cases, a counterpart of the support structure 500 can constrain the positions of the objects 300 to a lesser extent. In these cases, counterparts of the support patches 508 can be much larger than the individual footprints of the objects 300.

With reference again to FIGS. 1-17, the method 400 can include determining expected object locations (block 402c). In at least some cases, the expected object locations are respective object-carrying locations of the support structure 500. Furthermore, these expected object locations can be based at least partially on the registered model of the support structure 500 in the world state 213 and/or on derivatives thereof (e.g., on the support patches 508). Alternatively, the expected object locations can be derived directly from localizing the fiducials 502. For example, adding the model of the support structure 500 and/or the support patches 508 to the world state 213 can be bypassed. Furthermore, the expected object locations can be based on object positions with no dependence on the support structure 500. For example, counterparts of the objects 300 carrying localization features (e.g., AprilTags) can be placed in expected object locations, localized via the robot 100 to add the expected object locations to the world state 213, and then removed. This process can be repeated if the environment changes (e.g., if a support structure is moved).

Figure 15:
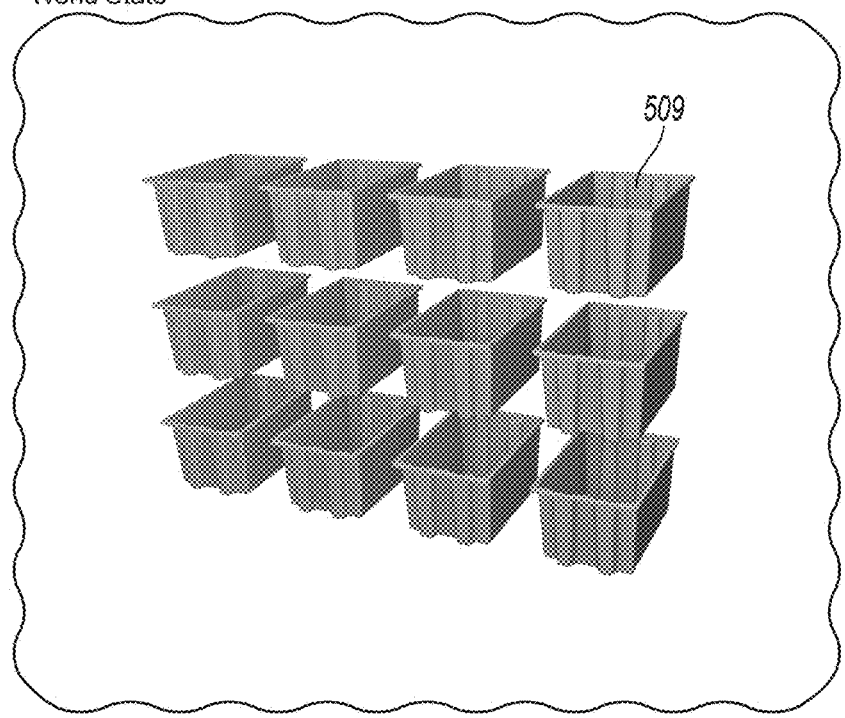
FIG. 15 is a representation of model copies corresponding to the expected object locations in the world state of the software architecture of FIG. 5.
Figure 16:
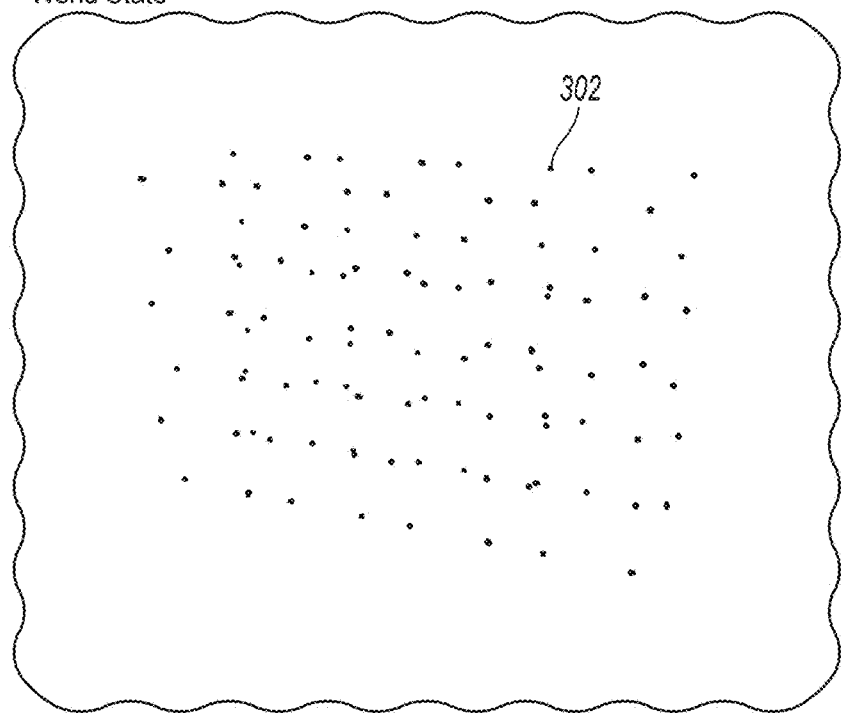
FIG. 16 is a representation of corners corresponding to the expected object locations in the world state of the software architecture of FIG. 5.
Figure 17:
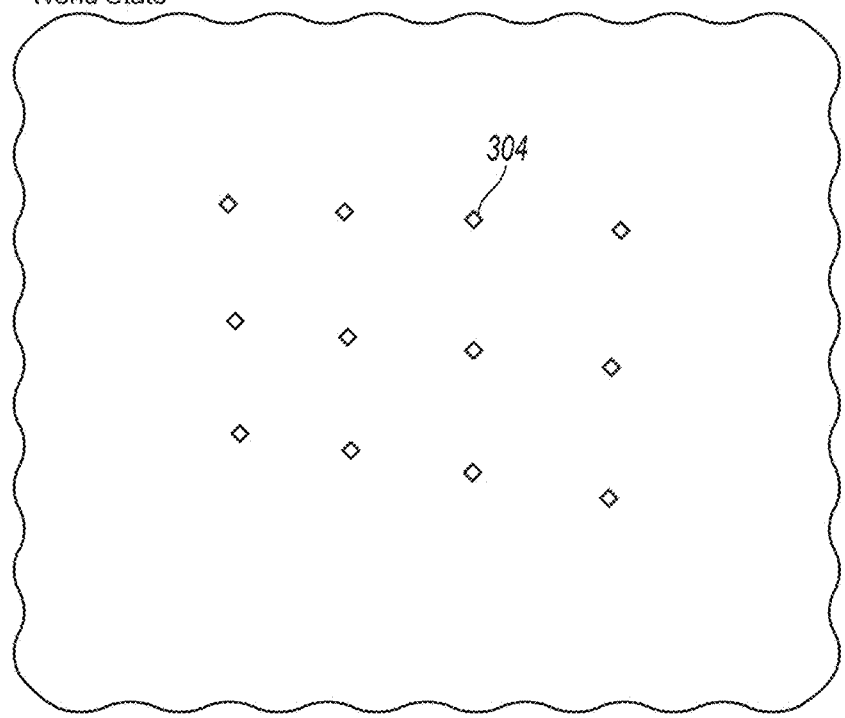
FIG. 17 is a representation of centroids corresponding to the expected object locations in the world state of the software architecture of FIG. 5.

The expected object locations can have a variety of suitable forms. In at least some cases, the software architecture 200 (e.g., via the expected object location estimator 256) adds copies 509 of a model of the object 300 to the world state 213 as shown in FIG. 15. The software architecture 200 (e.g., via the expected object location estimator 256) can access a model of the object 300 from the library 258 and register one or more copies of the model with the location of the fiducials 502, the location of the support structure 500, and/or the locations of the support patches 508. Thus, the expected object locations can be based at least partially on the location of the landmark, directly or indirectly. In at least some cases, determining the expected object locations includes aligning one or more shape features of the objects 300 (e.g., a corner, an edge, a surface, etc.) with a location of the support structure 500.

The method 400 can include determining a single expected object location or multiple expected object locations. In the latter case, the expected object locations can be non-overlapping or overlapping. For example, individual bays 506 of the support structure 500 can correspond to the respective object-carrying locations of the support structure 500 and to respective non-overlapping expected object locations. Where a counterpart of the support structure 500 is configured to carry the object 300 without significantly constraining the positions of the object 300 and in other cases, the software architecture 200 (e.g., via the expected object location estimator 256) can add overlapping copies of the model of the object 300 to the world state 213 Overlapping expected object locations can be useful, for example, when a counterpart of the support structure 500 is a conveyor, a table, a shelf, a countertop, etc. In these and other cases, objects carried by such a support structure may tend to be less constrained than objects carried by a rack-type support structure, such as the support structure 500. To be clear, however, the use of overlapping expected object locations can be useful whether or not objects at the expected object locations are highly constrained.

The software architecture 200 (e.g., via the expected object location estimator 256) can add the expected object locations to the world state 213 in a variety of forms. For example, the software architecture 200 (e.g., via the expected object location estimator 256) can add the model copies 509 shown in FIG. 15 and/or derivative information to the world state 213. Examples of derivative information include the corners 302 shown in FIG. 16, other shape features of the objects 300 (e.g., edges, surfaces, etc.), and the centroids 304 shown in FIG. 17. This information can exist in the world state 213 as sets of coordinates in a three-dimensional space or in another suitable form. In addition or alternatively, this information can be stored in another manner or generated in real time without being added to the world state 213, such as at every timestep. As yet another example, the information can be stored in the world state 213 or another location and updated, such as after a predetermined number of timesteps. This can be useful to account for small spatial changes in the environment that may occur over time.

Figure 18:
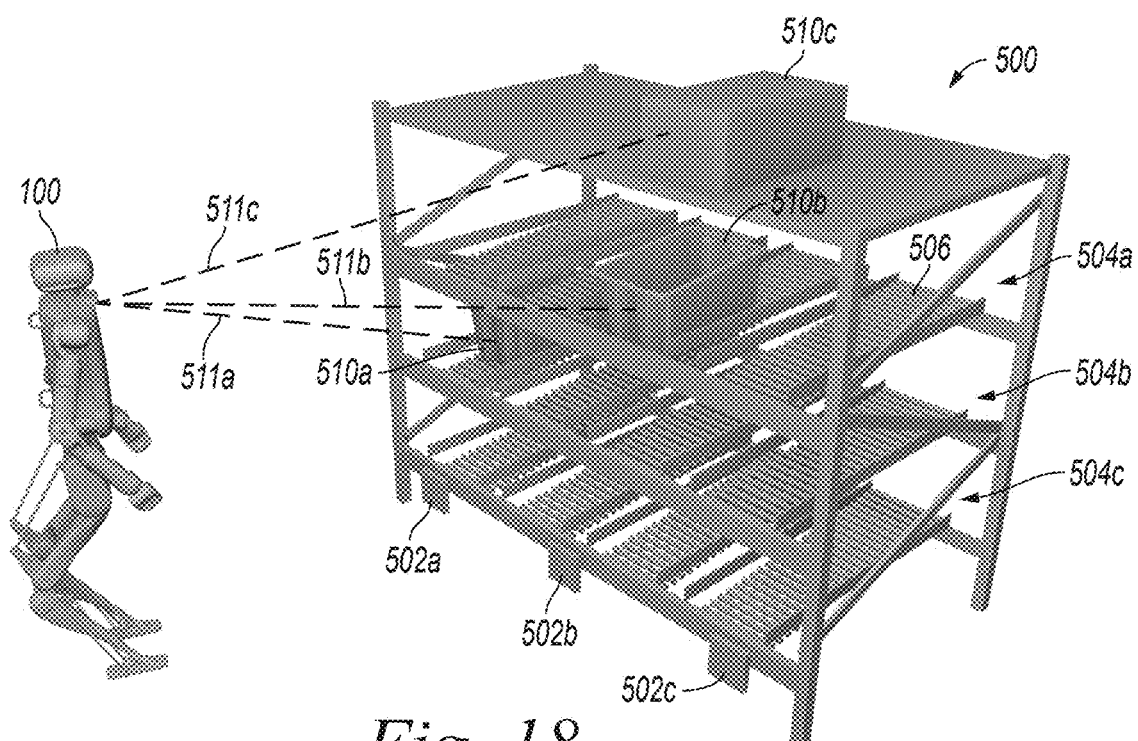
FIG. 18 is a perspective view of the robot of FIGS. 1-3, the support structure of FIG. 10, and several objects carried by the support structure at a time during an embodiment of the method of FIG. 9.
Figure 19:
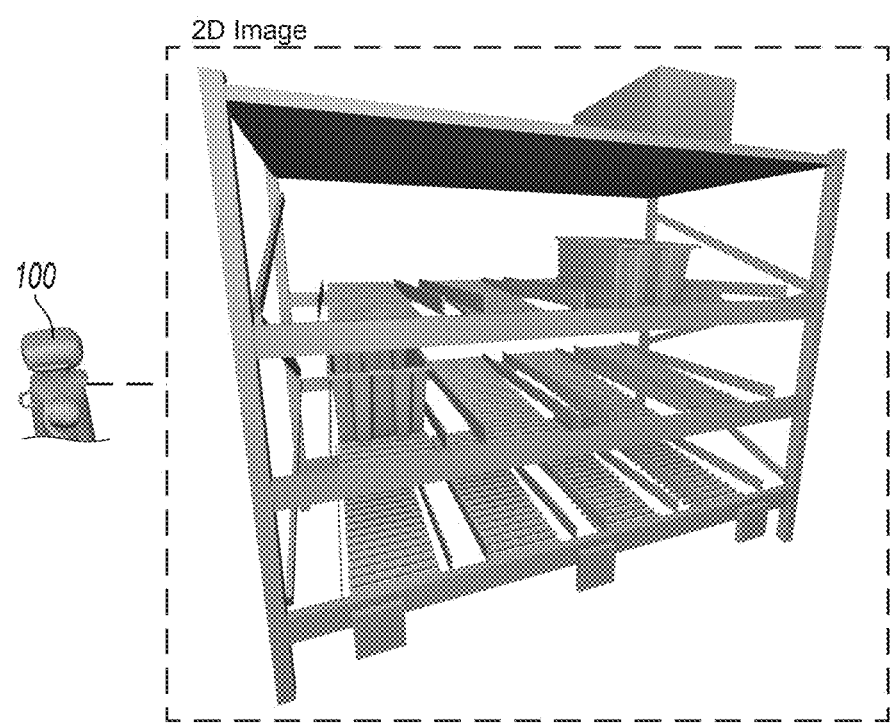
FIG. 19 is a representation of two-dimensional input to the robot of FIG. 1 at the time corresponding to FIG. 18.
Figure 20:
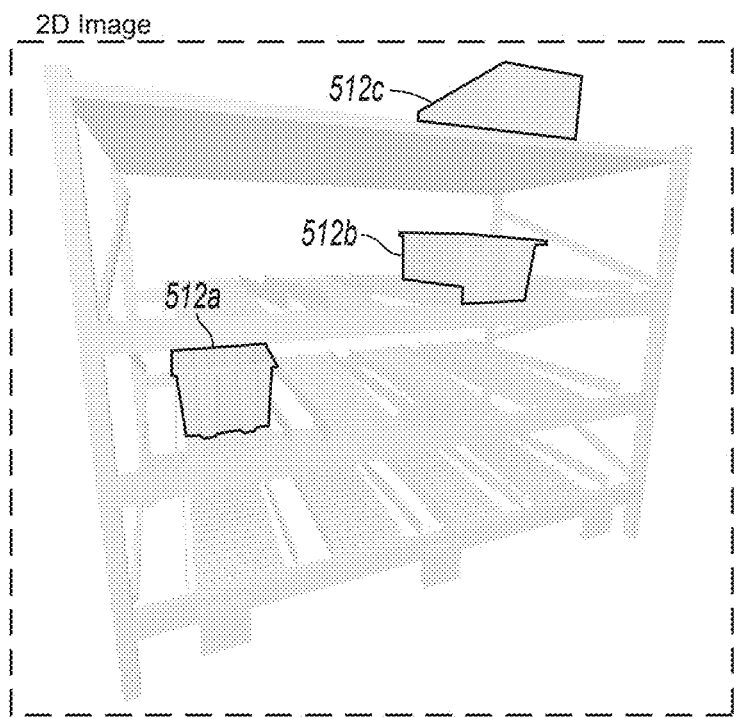
FIG. 20 is a representation of contours of putative object estimates corresponding to the objects of FIG. 18 overlying the two-dimensional input of FIG. 19 during an embodiment of the method of FIG. 9.
Figure 21:
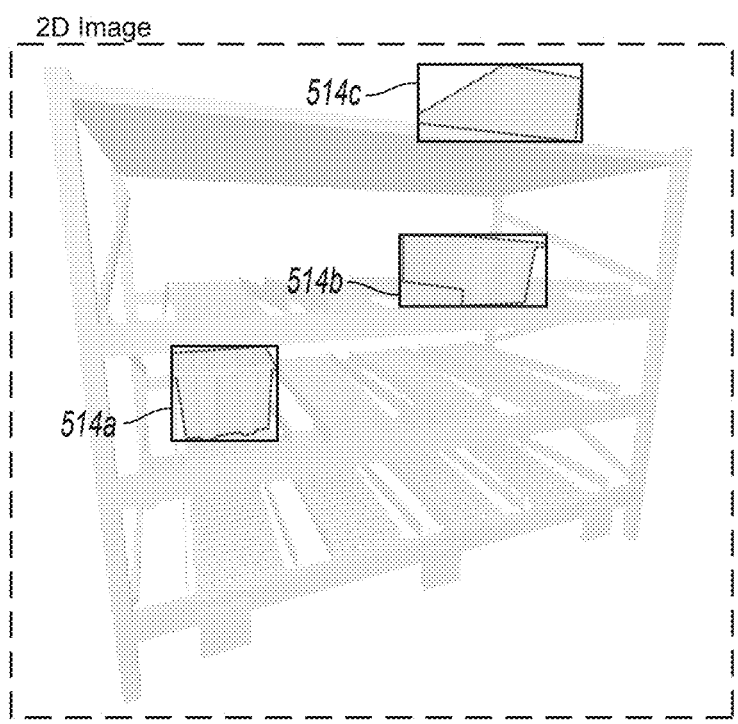
FIG. 21 is a representation of the contours of FIG. 20 and bounding shapes of the putative object estimates corresponding to the objects of FIG. 18 overlying the two-dimensional input of FIG. 19 during an embodiment of the method of FIG. 9.

The method 400 can further include generating a putative object estimate (block 402d). In at least some cases, generating the putative object estimates is based at least partially on the gathered sensor data, which can be the same or different than sensor data used to generate the expected object locations. FIG. 18 is a perspective view of the robot 100, the support structure 500, and several objects 510 (individually identified as objects 510a-510c) carried by the support structure 500 at a time during an embodiment of the method 400. In FIG. 18, dashed lines 511a-511c indicate two-dimensional perception of the objects 510a-510c. FIG. 19 is a representation of two-dimensional input to the robot 100 at the time corresponding to FIG. 18. With reference to FIGS. 1-19 together, the software architecture 200 (e.g., via the machine learning model 260) can generate the putative object estimates from the two-dimensional input. For example, the machine learning model 260 can receive an RGB (red-green-blue) image, process the image, estimate objects in the image, generate information corresponding to the estimated objects, and output the information. The output information can include bounding shapes (e.g., boxes), contours, key points corresponding to shape features (e.g., corners), etc. FIG. 20 is a representation of contours 512 (individually identified as contours 512a-512c) corresponding to putative object estimates for the objects 510a-510c, respectively, overlying the two-dimensional input of FIG. 19 during an embodiment of the method 400. Similarly, FIG. 21 is a representation of the contours 512 and bounding shapes 514 (individually identified as bounding shapes 512a-512c) of the putative object estimates overlying the two-dimensional input of FIG. 19 during an embodiment of the method 400. As shown in FIGS. 20 and 21, the software architecture 200 can generate the contours 512 and the bounding shapes 514 in a two-dimensional plane corresponding to the two-dimensional input (e.g., corresponding to an image plane of a camera of the robot 100).

Figure 22:
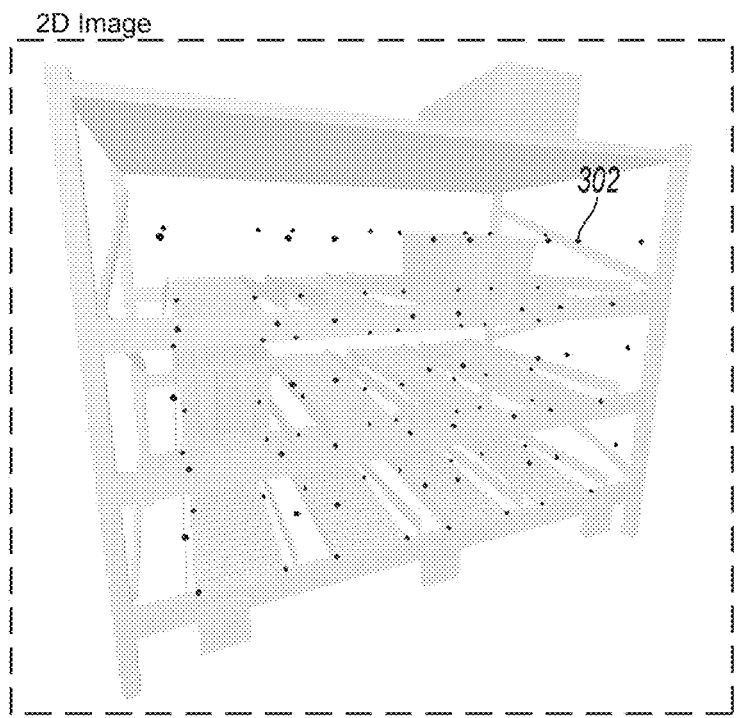
FIG. 22 is a representation of the corners of FIG. 16 projected onto the two-dimensional input of FIG. 19 during an embodiment of the method of FIG. 9.

The method 400 can further include determining correspondences between the putative object estimates and the expected object locations (block 402e). In at least some cases, this includes projecting information for the expected object locations from the world state 213 onto sensor data in a two-dimensional plane and/or in a three-dimensional space and comparing this projected information to corresponding information for the putative object estimates. Thus, determining the correspondences can be based at least partially on gathered sensor data (e.g., gathered two-dimensional data and/or three-dimensional data), which can be the same as or different than sensor data used for other purposes described herein. FIG. 22 is a representation of the corners 302 of the objects 300 projected onto the two-dimensional input of FIG. 19 during an embodiment of the method 400. Within the world state 213, the corners 302 can be organized into sets individually corresponding to different expected object locations. FIG. 22 is a representation of given sets of the corners 302 projected onto the two-dimensional input of FIG. 19 during an embodiment of the method 400. Projecting information from the world state 213 onto the two-dimensional input can include correlating respective reference frames of the world state 213, the two-dimensional sensor 250, and the expected object locations (e.g., via a reference frame for the support structure 500). In a particular example, a relationship between a reference frame of the world state 213 and a reference frame of the two-dimensional sensor 250 can be tracked via known movement of the robot 100 and/or via localization of the fiducials 502. This relationship can be used to correlate information in the world state 213 (e.g., coordinates of the corners 302) to the two-dimensional input based on a pinhole camera model.

Figure 23:
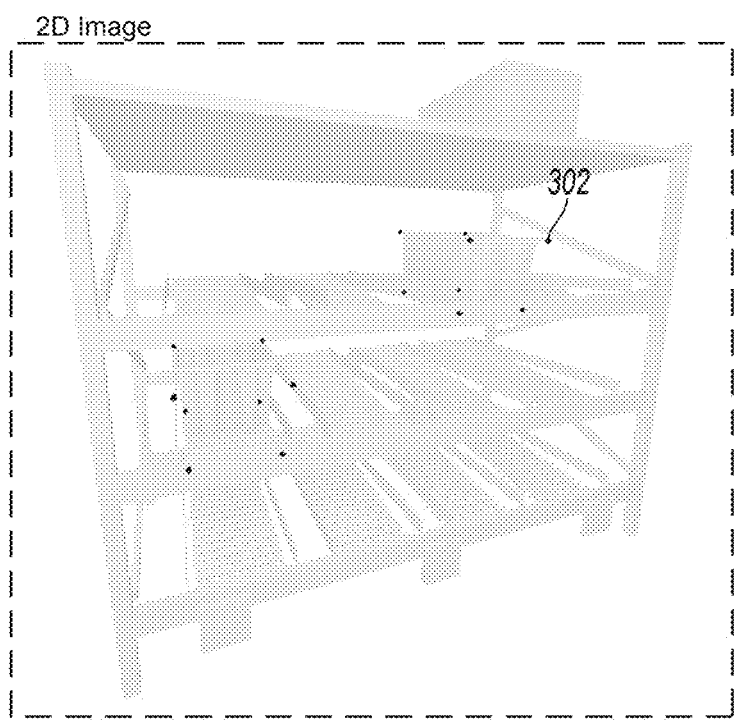
FIG. 23 is a representation of given sets of the corners of FIG. 16 projected onto the two-dimensional input of FIG. 19 during an embodiment of the method of FIG. 9.
Figure 24:
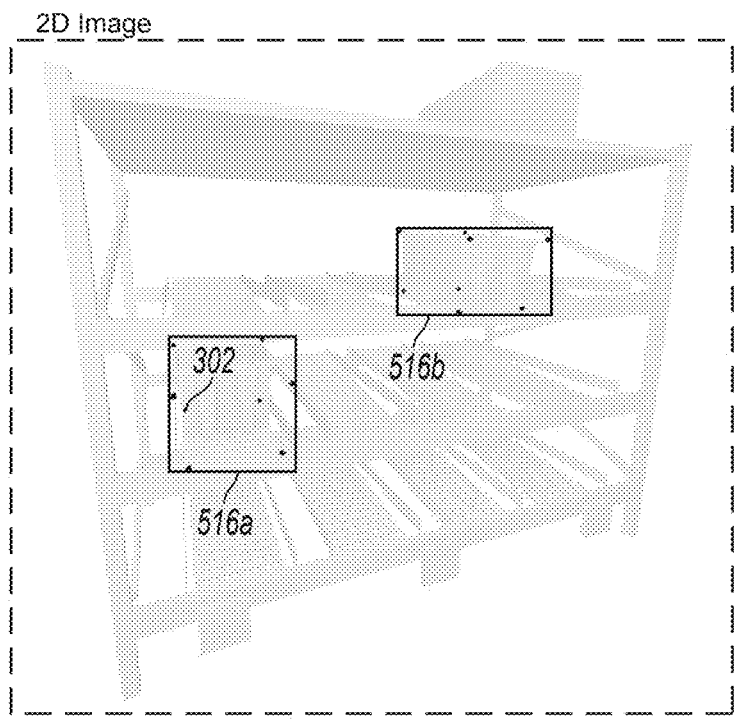
FIG. 24 is a representation of the given sets of the corners of FIG. 22 and corresponding bounding shapes projected onto the two-dimensional input of FIG. 19 during an embodiment of the method of FIG. 9.

The given sets of corners 302 can correspond to the expected object locations nearest to the putative object estimates, such as nearest to the contours 512a-512c or nearest to the bounding shapes 514a-514c. In the illustrated example, the same expected object location is nearest to both of the contours 512b, 512c and to both of the bounding shapes 514b, 514c. FIG. 23 is a representation of given sets of the corners 302 projected onto the two-dimensional input of FIG. 19 during an embodiment of the method 400. The software architecture 200 (e.g., via the expected object location estimate 256 and/or the two-dimensional checker 262) can create bounding shapes (e.g., boxes) for any expected object locations to be compared to putative object estimates. FIG. 24 is a representation of the given sets of corners 302 shown in FIG. 23 and corresponding bounding shapes 516 (individually identified as bounding shapes 516a, 516b) projected onto the two-dimensional input of FIG. 19 during an embodiment of the method 400. The bounding shapes 514a, 514b can represent a maximum range between the corners 302 of a given set in the two-dimensional plane corresponding to two-dimensional input to the robot 100 (e.g., corresponding to an image plane of a camera of the robot 100).

Figure 25:
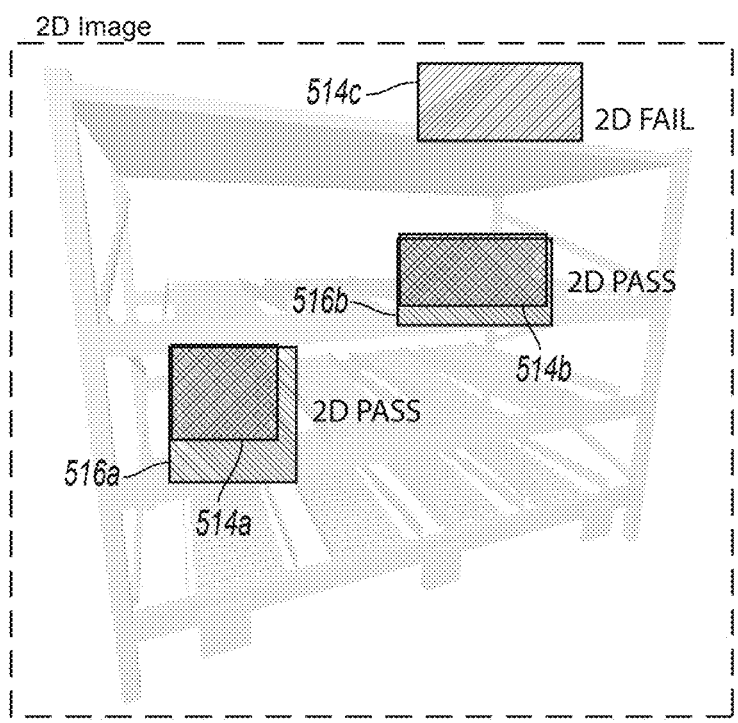
FIG. 25 is a representation of the bounding shapes of FIG. 21 overlying the two-dimensional input of FIG. 19, the bounding shapes of FIG. 24 projected onto the two-dimensional input of FIG. 19, and outputs of a two-dimensional checker of the software architecture of FIG. 5 during an embodiment of the method of FIG. 9.

FIG. 25 is a representation of the bounding shapes 514 overlying the two-dimensional input of FIG. 19 and the bounding shapes 516 projected onto the two-dimensional input of FIG. 19 during an embodiment of the method 400. In at least some cases, determining correspondence between a putative object estimate and a corresponding expected object location is based at least partially on comparing the putative object estimate and the expected object location in a two-dimensional plane. This comparison can include determining an intersection between the putative object estimate and the expected object location in the two-dimensional plane. The intersection can be an intersection between an area within a given one of the bounding shapes 514a-514c and an area within a corresponding one of the bounding shapes 516a, 516b. Areas within the bounding shapes 514a-514c and areas within the bounding shapes 516a, 516b are hatched in opposite directions in FIG. 25 for clarity of illustration. As shown in FIG. 25, the extent of intersection between the bounding shape 514a and the corresponding bounding shape 516a is high, as is the extent of intersection between the bounding shape 514b and the corresponding bounding shape 516b. The extent of intersection between the bounding shape 514c and the corresponding bounding shape 516b, however, is low.

The method 400 can further include processing the putative object estimates (block 402f). In at least some cases, this is based on correspondences between the putative object estimates and the expected object locations. FIG. 25 also shows outputs of the two-dimensional checker 262 during an embodiment of the method 400. Based on the intersections (or lack thereof), the two-dimensional checker 262 can pass the putative object estimates corresponding to the bounding shapes 514a, 514b for high correspondence with the nearest expected object locations. Similarly, the two-dimensional checker 262 can fail the putative object estimate corresponding to the bounding shape 514c for low correspondence with the nearest expected object location. In this case, differentiating between high correspondence and low correspondence between the putative object estimates and the nearest expected object locations is clear. In other cases, this differentiation can be subtle or misleading. One example of a useful approach to the comparison is based on an area of intersection and an area of union. For example, the two-dimensional checker 262 can determine a ratio of (a) an area of intersection between an area within a given one of the bounding shapes 514 and an area within a corresponding one of the bounding shapes 516 and (b) an area of union of the given one of the bounding shapes 514 and the area within the corresponding one of the bounding shapes 516. If this ratio is above a threshold (e.g., 0.5), the two-dimensional checker 262 can pass the putative object estimate corresponding to the given one of the bounding shapes 514 for high correspondence with the nearest expected object location. This approach, which can be a form of an intersection over union metric, can be useful because it tends to filter out unproductive intersections that can occur when putative object estimates are very large, such as when a putative object estimate is based on an object the robot 100 is carrying within a field of view of the two-dimensional sensor 250. Other approaches to determining this correspondence are also possible.

The goal of processing the putative object estimates can be to distinguish valid and productive putative object estimates from invalid and/or unproductive putative object estimates. As an example of invalidity, a given putative object estimate may correspond to an object that is not a correct type. In the illustrated example, the object 510c is a box rather than a tote. Objects of an incorrect type are less likely than objects of a correct type to be at an expected object location. Indeed, the object 510c is resting on top of the support structure 500 rather than in one of the bays 506. An object estimate, however, can be valid, but also unproductive. For example, the object 510a is a tote, but it is not positioned at a front portion of the support structure 500. As positioned, the object 510a may be inaccessible to the robot 100. The correspondence between the putative object estimate and the expected object location for the object 510a does not indicate this problem. Moreover, the two-dimensional checker 262 can incorrectly pass valid and invalid putative object estimates that happen to align with an expected object location in a field of view of the robot 100, but are nevertheless not at an expected object location in a three-dimensional space. This can occur, for example, with respect to an object the robot 100 (or another robot) carries in front of the support structure 500. For this and/or other reasons, it can be useful to supplement comparing the putative object estimates and the object-carrying locations in a two-dimensional plane with comparing the putative object estimates and the object-carrying locations in a three-dimensional space (e.g., after comparing the putative object estimates and the object-carrying locations in a two-dimensional plane). In still other cases, comparing the putative object estimates and the object-carrying locations can occur in a three-dimensional space only.

Figure 26:
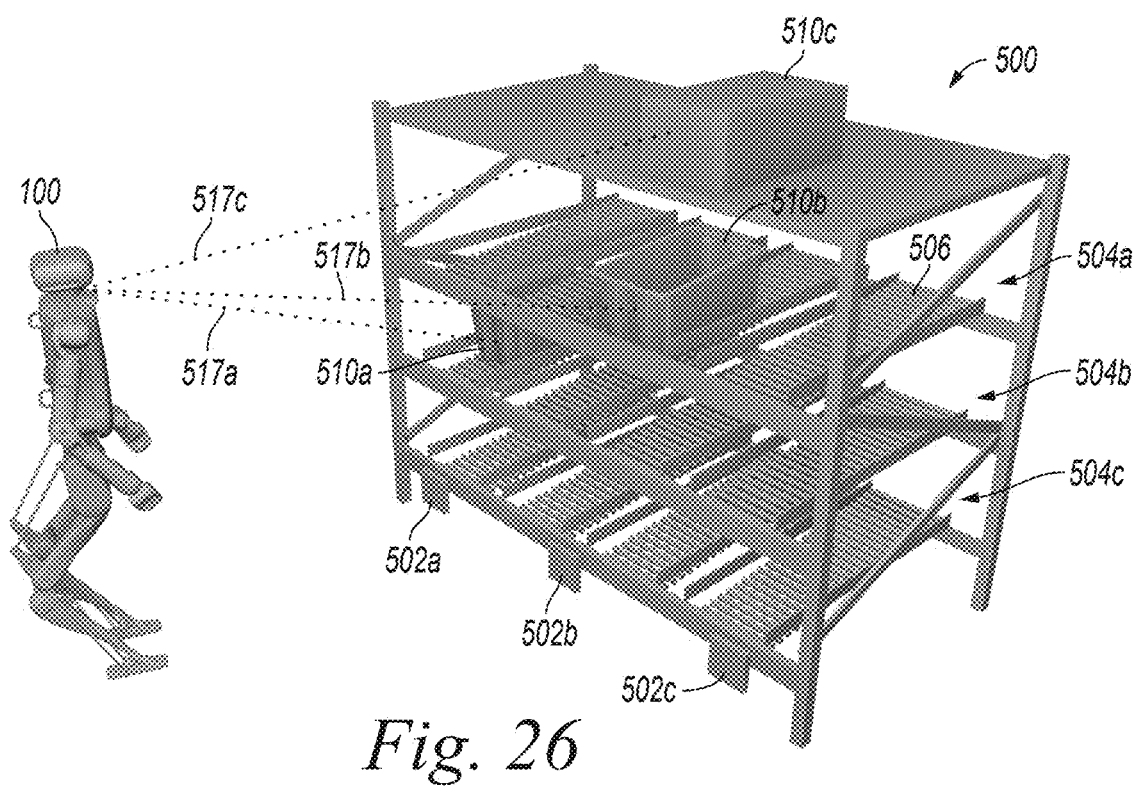
FIG. 26 is a perspective view of the robot of FIGS. 1-3, the support structure of FIG. 10, and the objects of FIG. 18 at a time during an embodiment of the method of FIG. 9.
Figure 27:
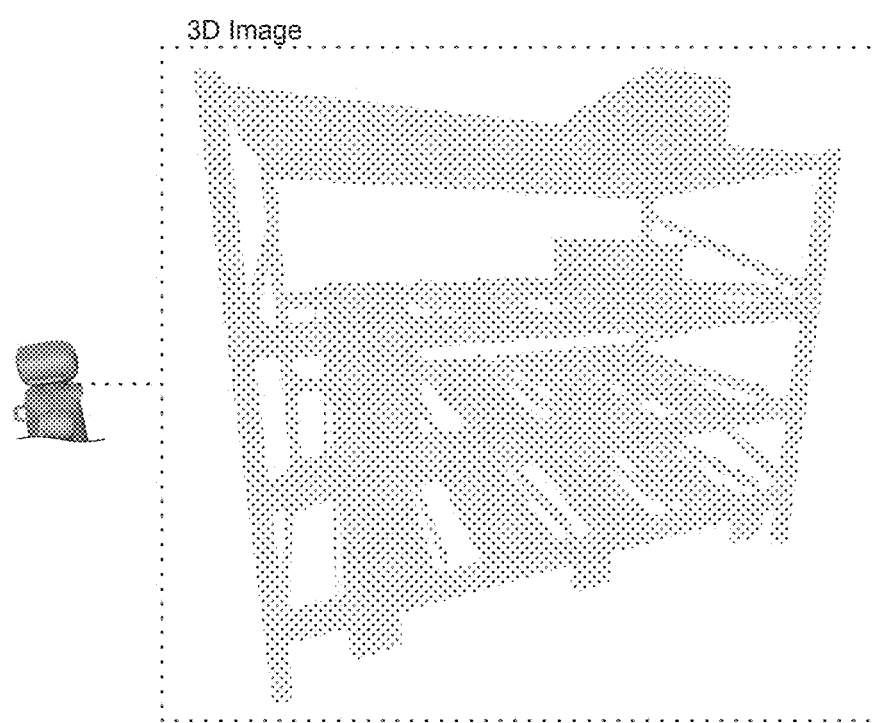
FIG. 27 is a representation of three-dimensional input to the robot of FIGS. 1-3 at the time corresponding to FIG. 26.

FIG. 26 is a perspective view of the robot 100, the support structure 500, and the objects 510a-510c at a time during an embodiment of the method 400. In FIG. 26, dotted lines 517a-517c indicate three-dimensional perception of the objects 510a-510c. FIG. 27 is a representation of three-dimensional input to the robot 100 at the time corresponding to FIG. 26. The three-dimensional input can be used to compare the putative object estimates and the expected object locations in a three-dimensional space. In at least some cases, the three-dimensional space defines a first dimension (x) parallel to an image plane of a camera of the robot 100, a second dimension (z) parallel to the image plane and perpendicular to the first dimension, and a third dimension (y) perpendicular to the image plane. Comparing the putative object estimates and the expected object locations can include determining an offset therebetween in a three-dimensional space. The offset can be a position offset, an orientation offset, and/or another suitable type of offset. As discussed below, it is sometimes useful to apply different tolerances to offset components in different respective dimensions. Accordingly, a coordinate frame of an offset can be relevant to analyzing the offset. In at least some cases, an offset is based on a coordinate frame oriented to an image plane of a camera of the robot 100, as mentioned above. Alternatively or in addition, an offset can be based on a coordinate frame oriented to an expected object location. Moreover, the coordinate frames for different expected object locations in a working environment can be the same or different.

Figure 28:
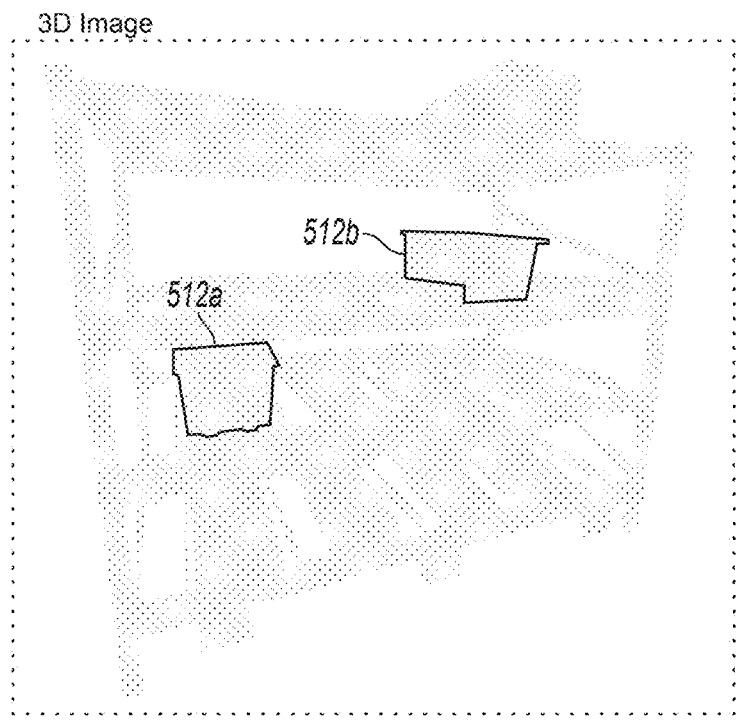
FIG. 28 is a representation of given contours of FIG. 20 projected onto the three-dimensional input of FIG. 27 during an embodiment of the method of FIG. 9.
Figure 29:
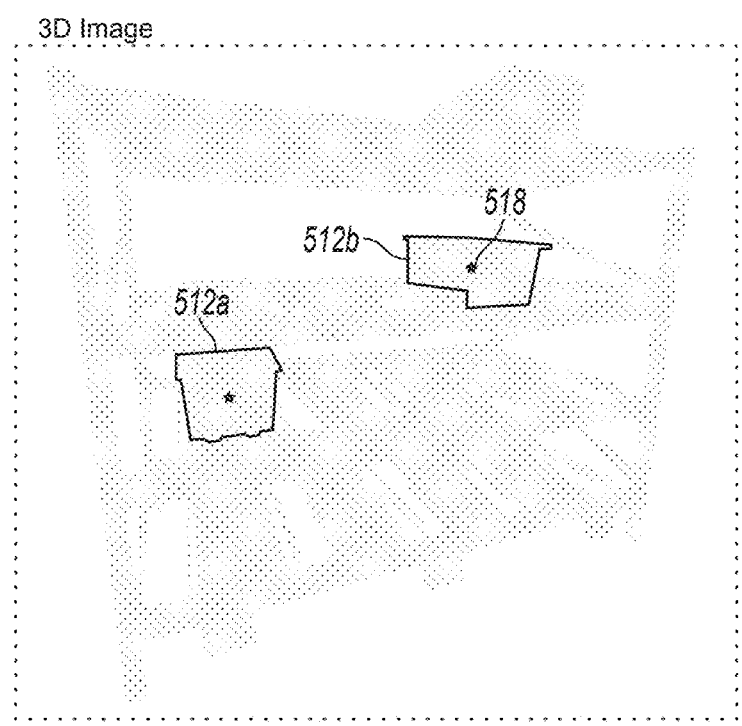
FIG. 29 is a representation of the given contours of FIG. 20 and corresponding centroids projected onto the three-dimensional input of FIG. 27 during an embodiment of the method of FIG. 9.

FIGS. 28-33 illustrate one approach to determining position offsets for putative object estimates corresponding to the object 510a, 510b, which passed a two-dimensional check. The method 400 can include projecting the putative object estimates onto three-dimensional input to the robot 100. This can include a process similar to the process described above for projecting information from the world state 213 onto two-dimensional input to the robot 100. For example, a relationship between a reference frame of the world state 213 and a reference frame of the three-dimensional sensor 252 can be tracked via known movement of the robot 100 and/or via localization of the fiducials 502. This relationship can be used to correlate information in the world state 213 (e.g., coordinates of the corners 302) to the three-dimensional input based on a pinhole camera model. FIG. 28 is a representation of the contours 512a, 512b projected onto the three-dimensional input of FIG. 27 during an embodiment of the method 400. In at least some cases, the software architecture 200 (e.g., via the three-dimensional segmenter 264) determines segments of the three-dimensional input corresponding to the contours 512a, 512b. These segments can define centroids 518. For example, a given one of the centroids 518 can have coordinates that are the median of all x values, the median of all y values, and the median of all z values within a given segment. FIG. 29 is a representation of the contours 512a, 512b and corresponding centroids 518 (shown as stars in FIG. 29) projected onto the three-dimensional input of FIG. 27 during an embodiment of the method 400. Given that the segments correspond mostly to outer surfaces of the objects 510a, 510b, the centroids 518 can be merely rough approximations of the positions of the objects 510a, 510b, yet sufficient to provide a useful filter in a three-dimensional space.

Figure 30:
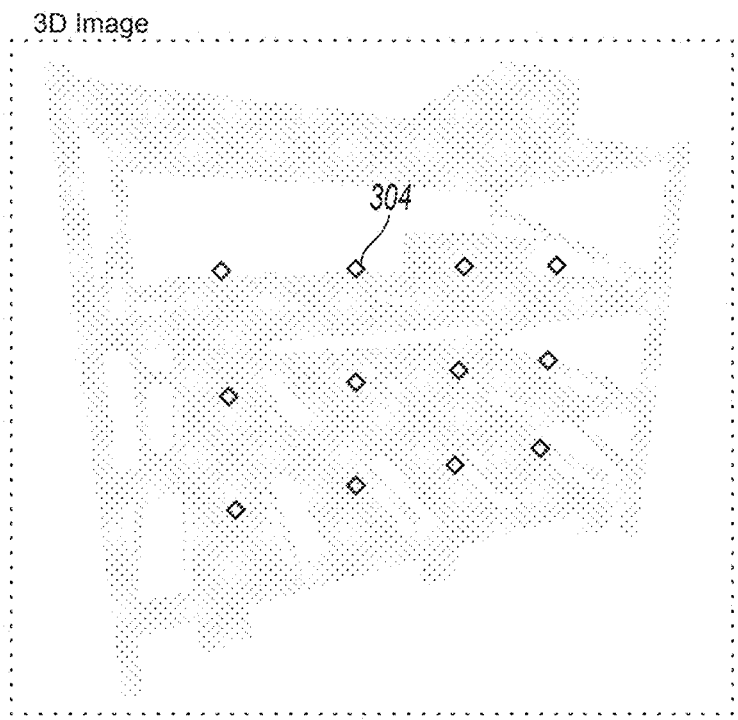
FIG. 30 is a representation of the centroids of FIG. 17 projected onto the three-dimensional input of FIG. 27 during an embodiment of the method of FIG. 9.
Figure 31:
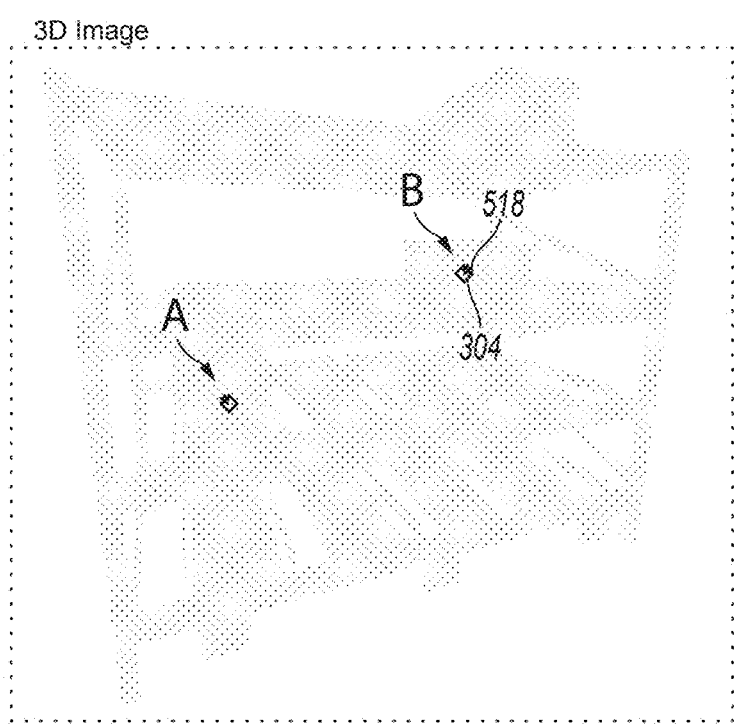
FIG. 31 is a representation of given centroids of FIG. 17 and the centroids of FIG. 29 projected onto the three-dimensional input of FIG. 27 during an embodiment of the method of FIG. 9.

The offset for comparing a putative object estimate and an expected object location can be at least partially based on a position difference between a centroid of the putative object estimate and a centroid of the expected object location. Corresponding, the method 400 can include projecting the centroids 304 onto three-dimensional input to the robot 100. FIG. 30 is a representation of the centroids 304 projected onto the three-dimensional input of FIG. 27 during an embodiment of the method 400. The software architecture 200 (e.g., via the three-dimensional checker 266) can identify the individual centroids 304 nearest to the individual centroids 518. FIG. 31 is a representation of the centroids 518 and the nearest centroids 304 projected onto the three-dimensional input of FIG. 27 during an embodiment of the method 400. As mentioned above, various differences between an expected object location and an putative object estimate can have greater or lesser value in distinguishing valid and productive estimates from invalid and/or unproductive estimates. In at least some cases, the software architecture 200 (e.g., via the three-dimensional checker 266) compares the individual centroids 518 to each one or to given ones of the centroids 304 in a manner that gives certain positional differences more weight than others. A position offset between a given one of the centroids 518 and a given one of the centroids 304 can be a weighted offset in which a difference in one dimension (x, y, or z) has a different weight than a difference in another dimension. For example, a difference in a dimension (x or z) parallel to a field of view of the two-dimensional sensor 250 and/or of the three-dimensional sensor 252 can have greater weight than a difference in a dimension (y) perpendicular to these dimensions.

Figure 32:
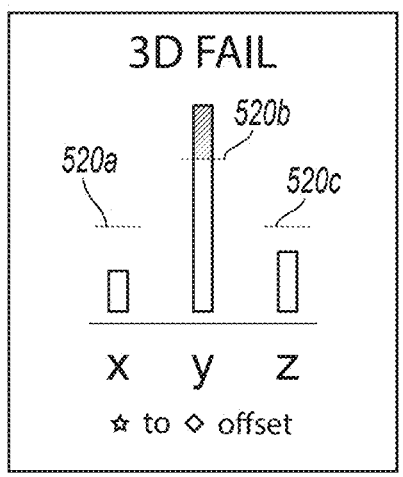
FIG. 32 is a chart showing respective offsets in three dimensions between a centroid of FIG. 17 and a centroid of FIG. 29 at region A in FIG. 31 and a corresponding output of a three-dimensional checker of the software architecture of FIG. 5 during an embodiment of the method of FIG. 9.
Figure 33:
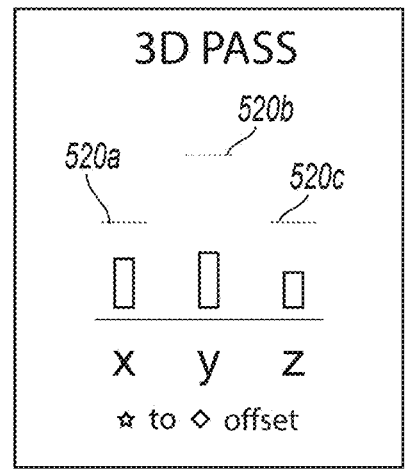
FIG. 33 is a chart showing respective offsets in three dimensions between a centroid of FIG. 17 and a centroid of FIG. 29 at region B in FIG. 31 and a corresponding output of a three-dimensional checker of the software architecture of FIG. 5 during an embodiment of the method of FIG. 9.

FIG. 32 is a chart showing respective offsets in three dimensions between the centroid 518 and the centroid 304 at region A in FIG. 31 and a corresponding output of the three-dimensional checker 266 during an embodiment of the method 400. FIG. 33 is a chart showing the same at region B in FIG. 31. FIGS. 32 and 33 also show outputs from the three-dimensional checker 266 for the putative object estimates corresponding to the centroids 518 at regions A and B of FIG. 31, respectively. As shown in FIGS. 32 and 33, the offsets can have different thresholds 520 (520a-520c) in different dimensions (x, y, z). In at least some cases, exceeding the threshold 520a-520c in any given dimension can cause the three-dimensional checker 266 to fail the corresponding putative object estimate. In the illustrated example, the putative object estimate corresponding to the object 510a fails and the putative object estimate corresponding to the object 510b passes. Approaches to adjusting for the effect of occlusion on the centroids 518 are also possible in addition to or instead of decoupling offsets in different dimensions. For example, when the robot 100 is likely to see only a front surface of an object, the three-dimensional checker 266 can adjust a centroid of three-dimensional data for a putative object estimate of the object to be farther from the robot 100 by half of the object's known depth. The direction in which the three-dimensional checker 266 moves a centroid in these and other cases can be based at least partially on a surface normal and/or another normal corresponding to the orientation of an object. For example, a centroid can be moved in a direction parallel to the normal of a front surface of an object.

Some other approaches to comparing a putative object estimate and an expected object location in a three-dimensional space involve determining an orientation offset instead of or in addition to determining a position offset. For example, determining the expected object locations can include determining normals for the expected object locations in a three-dimensional space. As with the corners 302 and the centroids 304, the normals can be derivatives of object models. Correspondingly, generating the putative object estimates can include generating normals for the putative object estimates in the three-dimensional space. For example, the three-dimensional input can include data corresponding to surfaces of the objects 300 (e.g., front surfaces) that tend to be unobstructed when the objects 300 are at the expected object locations. The software architecture 200 (e.g., via the three-dimensional checker 266) can recognize these surfaces and calculate corresponding normals. The software architecture 200 (e.g., via the three-dimensional checker 266) can then determine orientation offsets (e.g., as angles) based at least partially on orientation differences between the normals of the putative object estimates and the normals of the expected object locations.

If an orientation offset is below a threshold, the software architecture 200 (e.g., via the three-dimensional checker 266) can pass the corresponding putative object estimate. This can be effective because, like position, orientations for valid and productive estimates may tend to match orientations for expected object locations. In some cases, occlusion in the three-dimensional input may be less problematic in the context of determining orientation offsets than in the context of determining position offsets. In other cases, occlusion in the three-dimensional input may be less problematic in the context of determining position offsets than in the context of determining orientation offsets. For this and/or other reasons, three-dimensional checks based on position and orientation can be used together (e.g., simultaneously, with orientation as a check on position, or with position as a check on orientation) to improve the performance of the three-dimensional checker 266.

Processing the putative object estimates can further include updating the world state 213 at least partially based on output from the object estimator 212. For example, when correspondence between a putative object estimate and an expected object location (e.g., any expected object location) is low, the software architecture 200 (e.g., via the object estimator 212) can exclude a model and/or other information corresponding to the putative object estimate from the world state 213. In contrast, when correspondence between a putative object estimate and an expected object location (e.g., any expected object location) is high, the software architecture 200 (e.g., via the object estimator 212) can include a model and/or other information corresponding to the putative object estimate in the world state 213. In the illustrated example, the two-dimensional checker 262 identified low correspondence between the putative object estimate corresponding to the object 510c and the expected object locations (FIG. 25). Also in the illustrated example, the three-dimensional checker 266 identified low correspondence between the putative object estimate corresponding to the object 510a and the expected object locations (FIG. 32). The objects 510a, 510c, therefore, can be excluded from the world state 213. The object 510b, which corresponds to a putative object estimate that the two-dimensional checker 262 and the three-dimensional checker 266 passed can be added to the world state 213.

Figure 34:
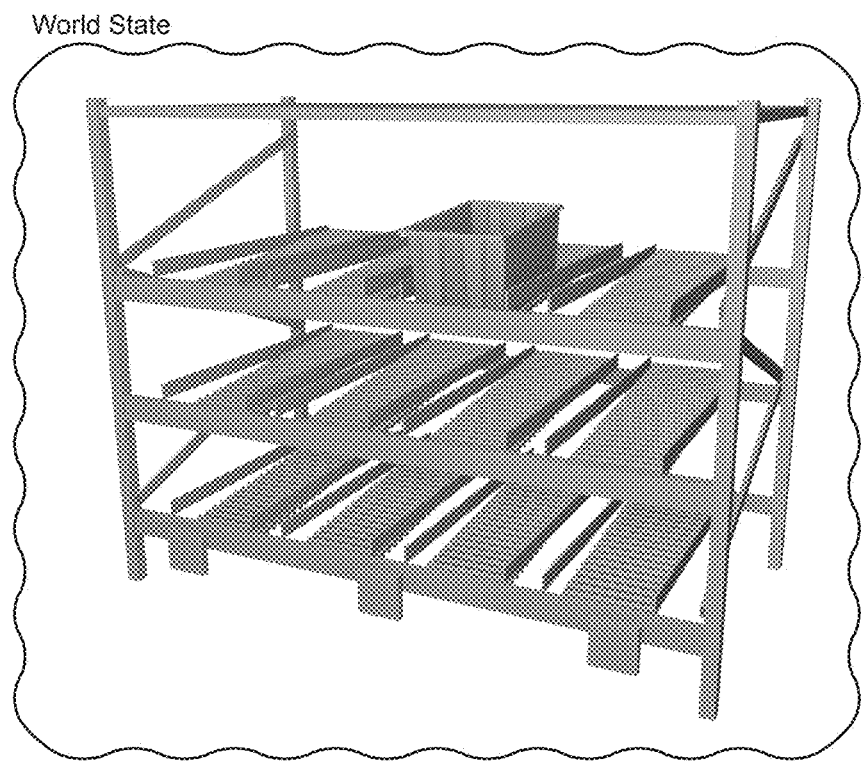
FIG. 34 is a representation of the support structure of FIG. 10 and one of the objects of FIG. 18 in the world state of the software architecture of FIG. 5.

FIG. 34 is a representation of the support structure 500 and the object 510b in the world state 213. The world state 213, therefore, does not correspond to reality (FIGS. 18 and 26) because it excludes the objects 510a, 510c. This discrepancy, however, can be useful because the objects 510a, 510c are not objects targeted for manipulation. The object 510a is not properly positioned for manipulation. The object 510c is not properly positioned for manipulation and is not a targeted type of object (i.e., it is a box rather than a tote). The software architecture 200 can update the world state 213 at every timestep or only at some timesteps. Furthermore, an update may depend on a condition, such as agreement between the results at two, three, four, etc. successive timesteps. In at least some cases, updating the world state 213 involves setting expected object locations to either valid or invalid. For example, in the world state 213 of FIG. 34, the expected object location corresponding to the object 510b can be set to valid whereas all other expected object locations can be set to invalid. To reduce demand for computing resources and/or for other reasons, the expected object locations can be maintained in the world state 213 as proxies for objects to be manipulated.

Figure 35:
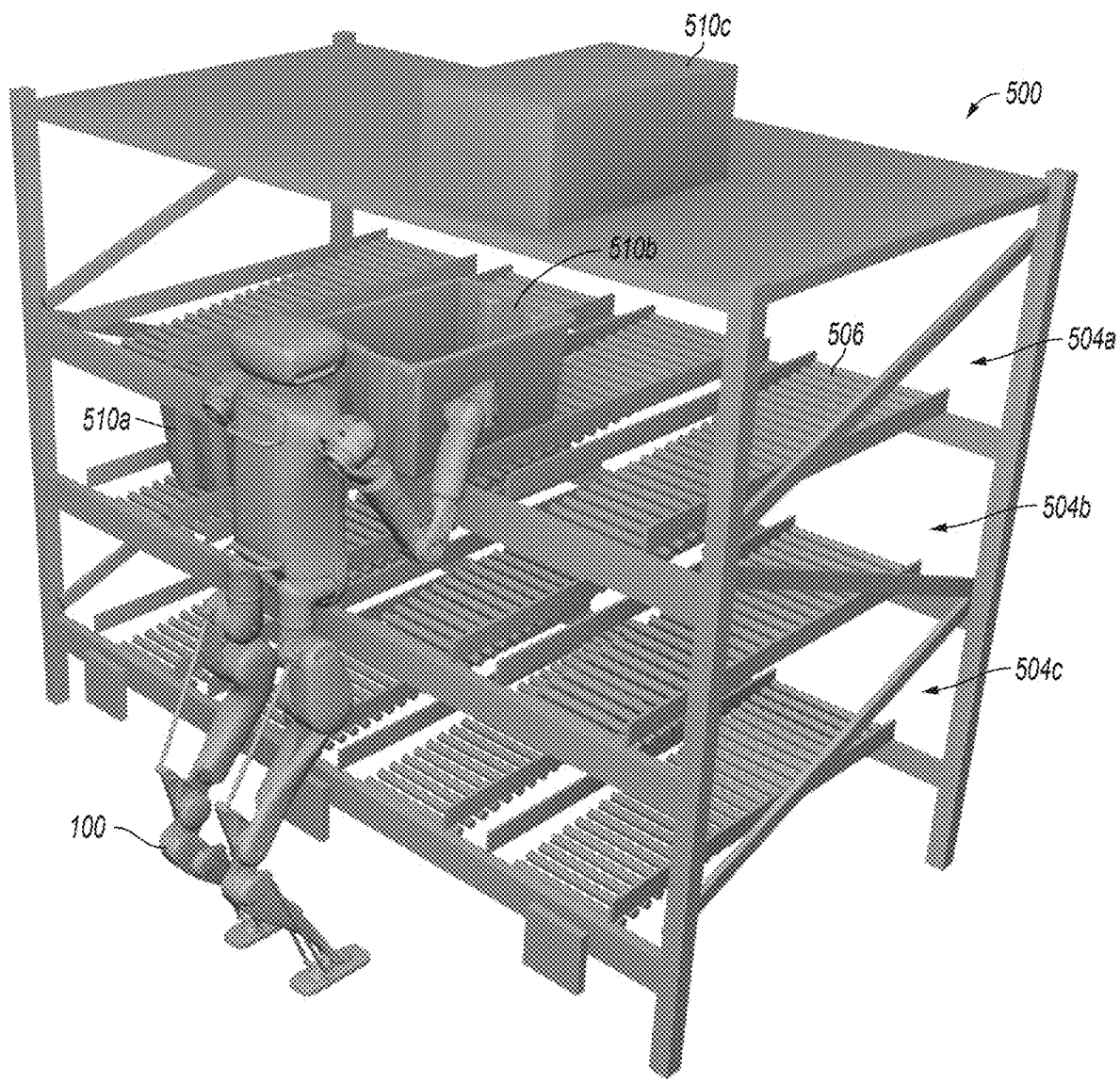
FIG. 35 is a perspective view of the robot of FIGS. 1-3 retrieving the object of FIG. 34 from the support structure of FIG. 10 in accordance with at least some embodiments of the present technology.

The method 400 can further include controlling the robot 100 (block 402g) based at least partially on a result of processing the putative object estimate, such as an updated version of the world state 213. When comparing a putative object estimate and an expected object location indicates that the putative object estimate is valid and productive, the method 400 can include controlling a pose of the robot 100 to retrieve an object at the expected object location. By way of illustration, FIG. 35 is a perspective view of the robot 100 retrieving the object 510b from the support structure 500 after object estimator 212 has determined that the putative object estimate corresponding to the object 510b is valid and productive. After retrieving an object from an expected object location, the method 400 can include removing a model or other information corresponding to the expected object location from the world state 213. For example, the expected object location corresponding to the object 510b can be set to invalid after the robot 100 retrieves the object 510b.

In at least some cases, comparing putative object estimates and expected object locations can be used in an autonomous or near-autonomous process for improving object detection accuracy. For example, when the robot 100 is initially deployed in a working environment, the machine learning model 260 may be poorly tuned to variables of the working environment (e.g., lighting particularities, extraneous object types, etc.). As the robot 100 operates in the new working environment, output from the three-dimensional checker 266 and/or other results from the object estimator 212 can be provided to the machine learning model 260. This output can serve a function similar to that of human-annotated training examples. Especially when the machine learning model 260 receives results from multiple robots, its performance may improve quickly with little or no need for human involvement or the use of unreliable simulated training examples. As the autonomous or near-autonomous training progresses, the thresholds used to distinguish between valid and productive putative object estimates and invalid and/or unproductive object estimates can be tightened. Examples of these thresholds include the intersection-over-union threshold of the two-dimensional checker 262 and the offset thresholds 520 of the three-dimensional checker 266.

Although only a single type of object is shown in the figures, it should be understood that aspects of various embodiments of the present technology can be implemented for multiple types of objects simultaneously. Different types of objects can have the same or different expected locations in a working environment. For example, an embodiment of the method 400 can include generating a different putative object estimate for a different type of object and determining a different expected object location for the different type of object. The embodiment can further include determining a different correspondence between the different putative object estimate and the different expected object location and processing the different putative object estimate based at least partially on the different correspondence. Finally, the embodiment can include controlling the robot 100 based at least partially on a result of processing the different putative object estimate.

Expected object locations for different types of objects can be overlapping or non-overlapping. Furthermore, certain expected object locations in a working environment may be incompatible with containing non-corresponding object types. In an example, an expected object location for a tote may be at a storage bay of a rack in a working environment while an expected object location of a push bar of a door in the working environment is at a different location elevated and adjacent to a surface of the door. The door surface in this example is incompatible with carrying a tote. Accordingly, aspects of a working environment (e.g., a location of a rack, a location of a door, etc.) can be used to filter out nonsensical putative object estimates and thereby improve both object detection and object discrimination. Among other applications, this can be useful to facilitate differentiating between different types of objects to be retrieved. For example, expected object locations for small boxes may be at a shelf too small to carry totes. Filtering out putative object estimates of totes at the shelf as failing to correspond to expected object locations for the totes can facilitate detecting the small boxes. Inappropriate implementation of a robot process for retrieving a tote at the shelf can thereby be avoided.

CONCLUSION

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may be disclosed herein in the context of those embodiments, other embodiments may also exhibit such advantages, and not all embodiments need necessarily exhibit such advantages or other advantages disclosed herein to fall within the scope of the present technology. This disclosure and the associated technology can encompass other embodiments not expressly shown or described herein.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Any reference herein to "the inventors" means at least one inventor of the present technology. As used herein, the terms "generally," "substantially," "about," and similar terms are used as terms of approximation and not as terms of degree, and are intended to account for the inherent variations in measured or calculated values that would be recognized by those of ordinary skill in the art. Additionally, the terms "comprising," "including," "having," and the like are used throughout this disclosure to mean including at least the recited feature(s) such that any greater number of the same feature(s) and/or one or more additional types of features are not precluded. This is the case even if a particular number of features is specified unless that specified number is preceded by the word "exactly" or another clear indication that it is intended to be closed ended. In a particular example, "comprising two arms" means including at least two arms.

Directional terms, such as "upper," "lower," "front," "back," "vertical," and "horizontal," may be used herein to express and clarify the relationship between various structures. It should be understood that such terms do not denote absolute orientation. The term "centroid" as used herein refers to a center-like data element for a given shape in three-dimensional space. There are several known approaches to calculating centroids including approaches of greater and lesser precision. No particular approach is contemplated herein. Reference herein to "one embodiment," "an embodiment," or similar phrases means that a particular feature, structure, or operation described in connection with such phrases can be included in at least one embodiment of the present technology. Thus, such phrases as used herein are not all referring to the same embodiment. Unless preceded with the word "conventional," reference herein to "counterpart" devices, systems, methods, features, structures, or operations refers to devices, systems, methods, features, structures, or operations in accordance with at least some embodiments of the present technology that are similar to a described device, system, method, feature, structure, or operation in certain respects and different in other respects. Finally, it should be noted that various particular features, structures, and operations of the embodiments described herein may be combined in any suitable manner in additional embodiments in accordance with the present technology.

We claim:

1. A method comprising:
   generating, by data-processing hardware operably associated with a mobile robot, a putative object estimate;
   determining, by the data-processing hardware, a location of a fiducial marker within a working environment in which the mobile robot operates;
   determining, by the data-processing hardware, a location of a support structure within the working environment based at least partially on the location of the fiducial marker;
   determining, by the data-processing hardware, an expected object location in the working environment, wherein the expected object location is an object-carrying location of the support structure, and wherein determining the expected object location includes determining the expected object location based at least partially on the location of the support structure and known structure data corresponding to the support structure;
   determining, by the data-processing hardware, a correspondence between the putative object estimate and the expected object location;
   processing, by the data-processing hardware, the putative object estimate based at least partially on the correspondence, wherein processing the putative object estimate includes validating the putative object estimate; and
   controlling the mobile robot based at least partially on a result of processing the putative object estimate, wherein controlling the mobile robot includes controlling the mobile robot to retrieve an object from the expected object location.

2. The method of claim 1, wherein:
   processing the putative object estimate includes including, based at least partially on the correspondence being high, information corresponding to the putative object estimate in a map of the working environment; and
   the method further comprises removing the information corresponding to the putative object estimate from the map after controlling the mobile robot to retrieve the object from the expected object location.

3. The method of claim 1, further comprising gathering, by the mobile robot, sensor data corresponding to the working environment, wherein generating the putative object estimate includes generating the putative object estimate based at least partially on the sensor data.

4. The method of claim 1, wherein generating the putative object estimate includes generating the putative object estimate via a machine-learning model in communication with the data-processing hardware.

5. The method of claim 4, further comprising training the machine-learning model on the result of processing the putative object estimate.

6. The method of claim 1, wherein:
   the expected object location is a first expected object location;
   the correspondence is a first correspondence;
   the method further comprises:
      determining, by the data-processing hardware, additional expected object locations in the working environment, and
      determining, by the data-processing hardware, additional correspondences between the putative object estimate and the additional expected object locations, respectively; and
   processing the putative object estimate includes processing the putative object estimate based at least partially on the additional correspondences.

7. The method of claim 6, wherein the first and additional expected object locations are overlapping.

8. The method of claim 7, wherein:
   the additional expected object locations are additional respective object-carrying locations of the support structure; and
   the support structure is selected from the group consisting of conveyors, tables, shelves, countertops, or combinations thereof.

9. The method of claim 6, wherein the first and additional expected object locations are non-overlapping.

10. The method of claim 9, wherein:
    the additional expected object locations are additional respective object-carrying locations of the support structure;
    the support structure is a rack including a plurality of bays spaced apart from one another; and
    individual bays among the plurality of bays correspond to the first and additional respective object-carrying locations.

11. The method of claim 1, further comprising:
    gathering, by a camera of the mobile robot, image data corresponding to the working environment; and
    projecting the expected object location onto the image data,
    wherein the correspondence is a correspondence between the putative object estimate and the expected object location projected onto the image data.

12. The method of claim 11, wherein projecting the expected object location includes projecting an object shape feature onto the image data.

13. The method of claim 12, wherein the object shape feature is a corner.

14. The method of claim 12, wherein the object shape feature is an edge.

15. The method of claim 12, wherein the object shape feature is a surface.

16. The method of claim 1, wherein determining the expected object location includes determining the expected object location based at least partially on the location of the support structure, the known structure data corresponding to the support structure, and known structure data corresponding to the object.

17. The method of claim 16, wherein the known structure data corresponding to the support structure is a model corresponding to the support structure.

18. The method of claim 17, wherein the known structure data corresponding to the object is a model corresponding to the object.

19. The method of claim 1, further comprising gathering, by a three-dimensional sensor of the mobile robot, depth data corresponding to the working environment, wherein determining the correspondence includes determining the correspondence based at least partially on the depth data.

20. The method of claim 1, further comprising:
   gathering, by a camera of the mobile robot, image data corresponding to the working environment; and
   gathering, by a three-dimensional sensor of the mobile robot, depth data corresponding to the working environment,
   wherein determining the correspondence includes determining the correspondence based at least partially on the image data and the depth data.

* * * * *